(12) United States Patent
Huang et al.

(10) Patent No.: US 11,895,302 B2
(45) Date of Patent: Feb. 6, 2024

(54) ADAPTIVE BILATERAL MATCHING FOR DECODER SIDE MOTION VECTOR REFINEMENT

(71) Applicant: QUALCOMM Incorporated, San Diego, CA (US)

(72) Inventors: Han Huang, San Diego, CA (US); Vadim Seregin, San Diego, CA (US); Wei-Jung Chien, San Diego, CA (US); Zhi Zhang, Munich (DE); Chun-Chi Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/847,942

(22) Filed: Jun. 23, 2022

(65) Prior Publication Data

US 2022/0417522 A1 Dec. 29, 2022

Related U.S. Application Data

(60) Provisional application No. 63/263,754, filed on Nov. 8, 2021, provisional application No. 63/216,468, filed on Jun. 29, 2021.

(51) Int. Cl.
*H04N 19/137* (2014.01)
*H04N 19/70* (2014.01)
(Continued)

(52) U.S. Cl.
CPC ......... *H04N 19/137* (2014.11); *H04N 19/105* (2014.11); *H04N 19/176* (2014.11); *H04N 19/70* (2014.11)

(58) Field of Classification Search
CPC .. H04N 19/105; H04N 19/137; H04N 19/176; H04N 19/513; H04N 19/52; H04N 19/56; H04N 19/70
See application file for complete search history.

(56) References Cited

U.S. PATENT DOCUMENTS

2020/0137414 A1\* 4/2020 Esenlik ................ H04N 19/139
2020/0137416 A1\* 4/2020 Esenlik ................ H04N 19/523
(Continued)

FOREIGN PATENT DOCUMENTS

WO WO-2022266328 A1 \* 12/2022

OTHER PUBLICATIONS

Chang Y-J., et al., "Compression Efficiency Methods Beyond VVC", 21. JVET Meeting, Jan. 6, 2021-Jan. 15, 2021, by teleconference, (The Joint Video Exploration Team of ISO/IEC JTC1/SC29/WG11 and ITU-T SG.16), No. JVET-U0100, Dec. 31, 2020, 13 Pages, XP030293237, sections 3.2 and 3.3.
(Continued)

*Primary Examiner* — Anner N Holder
(74) *Attorney, Agent, or Firm* — Polsinelli

(57) ABSTRACT

Systems and techniques are provided for processing video data. For example, the systems and techniques can include obtaining a current picture of video data and obtaining reference pictures for the current picture from the video data. A merge mode candidate can be determined for the current picture. First and second motion vectors can be identified for the merge mode candidate. A motion vector search strategy can be selected for the merge mode candidate from a plurality of motion vector search strategies. The selected motion vector search strategy can be associated with one or more constraints corresponding to at least one of the first motion vector or the second motion vector. The selected motion vector search strategy can be used to determine
(Continued)

refined motion vectors based on the first motion vector, the second motion vector, and the reference pictures. The merge mode candidate can be processed using the refined motion vectors.

20 Claims, 14 Drawing Sheets

(51) Int. Cl.
    *H04N 19/176*    (2014.01)
    *H04N 19/105*    (2014.01)

(56) References Cited

U.S. PATENT DOCUMENTS

2020/0296416 A1    9/2020    Liao et al.
2021/0144400 A1*    5/2021    Liu ..................... H04N 19/184
2022/0167001 A1*    5/2022    Zhang .................. H04N 19/57

OTHER PUBLICATIONS

Chen J., et al., "Algorithm Description for Versatile Video Coding and Test Model 12 (VTM 12)", JVET-U2002-v1, Joint Video Experts Team (JVET) of ITU-T SG 16 WP 3 and ISO/IEC JTC 1/SC 29, 21st Meeting, by teleconference, Jan. 6-15, 2021, pp. 104, Section [3.4 Inter Prediction].

Coban M., et al., "Algorithm Description of Enhanced Compression Model 3 (ECM 3)", 136. MPEG Meeting, Oct. 11, 2021-Oct. 15, 2021, Online, (Motion Picture Expert Group or ISO/IEC JTC1/SC29/WG11), No. m58426, Dec. 23, 2021, XP030302449, 28 Pages, Section [3.2.4 Multi-Pass Decoder-Side Motion Vector Refinement] Section [3.2.5 Adaptive Decoder-Side Motion Vector refinement].

Gao H., et al., "Decoder-Side Motion Vector Refinement in VVC: Algorithm and Hardware Implementation Considerations", IEEE Transactions on Circuits and Systems for Video Technology, IEEE, USA, vol. 31, No. 8,Nov. 9, 2020 (Nov. 9, 2020), pp. 3197-3211, XP011870333, ISSN: 1051-8215, DOI:10.1109/TCSVT.2020.3037024, vol. XX, 20XX, 2020, pp. 1-15, URL: http://dx.doi.org/10.1109/TCSVT.2020.3037024 [retrieved on Aug. 2, 2021] the whole document.

Han H., et al., "Adaptive Bilateral Matching for Decoder-Side Motion Vector Refinement Video Coding", 2022 Data a Compression Conference (DCC), IEEE, Mar. 22, 2022, pp. 1-7, XP034143769, DOI: 10.1109/DCC52660.2022.00042, [Retrieved on Jul. 4, 2022] Section [3. Proposed Adaptive Bilateral Matching for DMVR].

Huang (Qualcomm) H., et al., "EE2-Related: Adaptive Decoder Side Motion Vector Refinement", 23. JVET-W0107-V1, JVET Meeting, Jul. 7, 2021-Jul. 16, 2021, Teleconference, (The Joint Video Exploration Team of ISO/IEC JTC1/SC29/WG11 and ITU-TSG. 16), No. JVET-W0107, m57224, Jul. 1, 2021, XP030296053, 3 Pages.

International Search Report and Written Opinion—PCT/US2022/073155—ISA/EPO—dated Oct. 17, 2022.

* cited by examiner

ADAPTIVE BILATERAL MATCHING FOR DECODER SIDE MOTION VECTOR REFINEMENT

CROSS-REFERENCE TO RELATED APPLICATIONS

This application claims the benefit of U.S. Provisional Application No. 63/216,468, filed Jun. 29, 2021, and U.S. Provisional Application No. 63/263,754, filed Nov. 8, 2021, the disclosures of which are both hereby incorporated by reference, in their entirety and for all purposes.

FIELD

The present disclosure generally relates to video encoding and decoding. For example, aspects of the present disclosure include improving video coding techniques related to decoder-side motion vector refinement (DMVR) using bilateral matching.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding techniques with better coding efficiency are needed.

BRIEF SUMMARY

In some examples, systems and techniques are described for decoder-side motion vector refinement (DMVR) using adaptive bilateral matching. According to at least one illustrative example, an apparatus for processing video data is provided that includes at least one memory (e.g., configured to store data, such as video data, etc.) and at least one processor (e.g., implemented in circuitry) coupled to the at least one memory. The at least one processor is configured to and can: obtain one or more reference pictures for a current picture; identify a first motion vector and a second motion vector for a merge mode candidate; determine a selected motion vector search strategy for the merge mode candidate from a plurality of motion vector search strategies; determine, using the selected motion vector search strategy, one or more refined motion vectors based on at least one of the first motion vector or the second motion vector and the one or more reference pictures; and process the merge mode candidate using the one or more refined motion vectors.

In another example, a method for processing video data is provided. The method includes: obtaining one or more reference pictures for a current picture; identifying a first motion vector and a second motion vector for a merge mode candidate; determining a selected motion vector search strategy for the merge mode candidate from a plurality of motion vector search strategies; determining, using the selected motion vector search strategy, one or more refined motion vectors based on at least one of the first motion vector or the second motion vector and the one or more reference pictures; and processing the merge mode candidate using the one or more refined motion vectors.

In another example, a non-transitory computer-readable medium is provided that has stored thereon instructions that, when executed by one or more processors, cause the one or more processors to: obtain one or more reference pictures for a current picture; identify a first motion vector and a second motion vector for a merge mode candidate; determine a selected motion vector search strategy for the merge mode candidate from a plurality of motion vector search strategies; determine, using the selected motion vector search strategy, one or more refined motion vectors based on at least one of the first motion vector or the second motion vector and the one or more reference pictures; and process the merge mode candidate using the one or more refined motion vectors.

In another example, an apparatus for processing video data is provided. The apparatus includes: means for obtaining one or more reference pictures for a current picture; means for identifying a first motion vector and a second motion vector for a merge mode candidate; means for determining a selected motion vector search strategy for the merge mode candidate from a plurality of motion vector search strategies; means for determining, using the selected motion vector search strategy, one or more refined motion vectors based on at least one of the first motion vector or the second motion vector and the one or more reference pictures; and means for processing the merge mode candidate using the one or more refined motion vectors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
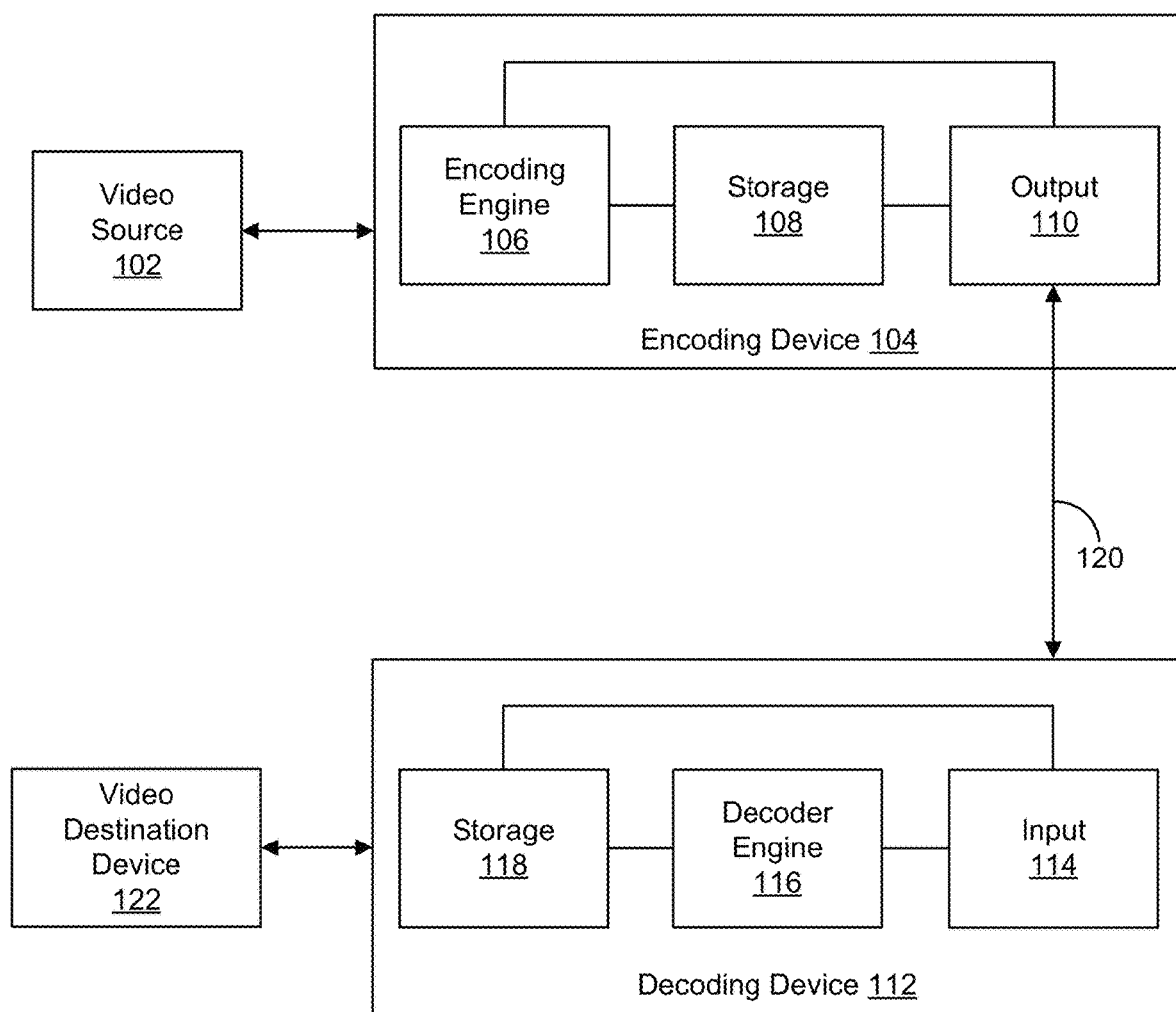
FIG. 1 is a block diagram illustrating an example of an encoding device and a decoding device, in accordance with some examples of the disclosure.

Certain aspects and aspects of this disclosure are provided below. Some of these aspects and aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides exemplary aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

Video coding devices (e.g., encoding devices, decoding devices, or combined encoding-decoding devices) implement video compression techniques to encode and/or decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements and, along with control information, form a coded representation of a video sequence. In some instances, the video encoder may entropy code syntax elements, thereby further reducing the number of bits needed for their representation.

A video decoder may construct, using the syntax elements and control information discussed above, predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Systems, apparatuses, processes (also referred to as methods), and computer-readable media (collectively referred to herein as "systems and techniques") are described herein for increasing the accuracy of one or more motion vectors that can be used by a video coding device (e.g., a video decoder or decoding device) when performing a prediction technique (e.g., an inter-prediction mode). For example, the systems and techniques can perform bilateral matching for decoder-side motion vector refinement (DMVR). Bilateral matching is a technique that refines a pair of two initial motion vectors. Such refinement can occur with a search around the pair of initial motion vectors to derive updated motion vectors that minimize a block matching cost. The block matching cost can be generated in a variety of ways, including using a sum of absolute difference (SAD) criteria, a sum of absolute transformed difference (SATD) criteria, a sum of square error (SSE) criteria, or other such criteria. Aspects described herein can increase the accuracy of motion vectors of a bi-prediction merge candidate, resulting in improved video quality and associated improved performance of devices operating in accordance with the aspects described herein.

In some aspects, the systems and techniques can be used to perform adaptive bilateral matching for DMVR. For example, the systems and techniques can perform bilateral matching using different search strategies and/or search parameters for different coded blocks. As will be explained in greater depth below, the adaptive bilateral matching for DMVR can be based on a selected search strategy that is determined or signaled for a given block. The selected search strategy can include one or more constraints for a bilateral matching search process. In some examples, the selected search strategy can additionally, or alternatively, include one or more constraints for a first motion vector difference and/or a second motion difference. In some examples, the selected search strategy can include one or more constraints between a first motion vector difference and a second motion vector difference.

In some aspects, a constraint is selected for motion vectors to be refined. The constraint can be a mirroring constraint, a zero constraint for a first vector, a zero constraint for a second vector, or other type of constraint. In some cases, the constraint is applied to a merge mode coded block within a merge candidate that satisfies one or more DMVR conditions. One or more constraints may then be used with one or more search strategies to identify candidates and select refined motion vectors.

In some aspects, different search strategies are used. The search strategies can be grouped into multiple subsets, with each subset including one or more search strategies. In some cases, a decoder can use a syntax element to determine a selected subset. For example, an encoder can include the syntax element in a bitstream. In such an example, the decoder may receive the bitstream and decode the syntax element from the bitstream. The decoder can use the syntax element to determine the selected subset and any associated constraint(s) for a given block or blocks of video data included in the bitstream. Using the selected subset and any constraint(s) associated with the subset, the decoder can process motion vectors (e.g., two motion vectors of a bi-prediction merge candidate) to identify refined motion vectors. In one illustrative aspect, an adaptive bilateral mode is provided, where a coding device signals selected motion information candidates that satisfy relevant DMVR conditions (e.g., with signaling structures as part of a new adaptive bilateral mode).

Using the above-noted search strategies and associated constraint(s) can provide improvements to decoder side motion vector refinement, such as by providing adaptive bilateral motion vector refinement using selectable search algorithms and associated constraints. Such improvements in decoder side motion vector refinement can be used with various video codecs, such as enhanced compression model (ECM) implementations. Examples described herein include an implementation applied to multi-pass DMVR to improve ECM systems that operate according to one or more video coding standards. The techniques described herein can be implemented using one or more coding devices, including one or more encoding devices, decoding devices, or combined encoding-decoding devices. The coding devices can be implemented by one or more of a player device, such as a mobile device, extended reality (XR) device, a vehicle or computing system of a vehicle, a server device or system (e.g., a distributed server system including multiple servers, a single server device or system, etc.), or other device or system.

The systems and techniques described herein can be applied to any existing video codecs, any video codecs that are in development, and/or any future video coding standards, including but not limited to High Efficiency Video Coding (HEVC), Advanced Video Coding (AVC), Versatile Video Coding (VVC), VP9, the AOMedia Video 1 (AV1) format/codec, and/or other video coding standard in existence, in development, or to be developed. The systems and techniques described herein can improve the operation of communication systems and devices in a system by improving the performance of video data transfer by devices with improved compression and associated improved video quality based on improved motion vector selection from adaptive bilateral matching as described herein.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enables parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning, QTBT partitioning, MTT partitioning, superblock partitioning, or other partitioning structure.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2..34 | INTRA_ANGULAR2.. INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some aspects, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some aspects following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a decoded picture buffer (DPB) for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some aspects, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU. When the CU is inter-coded, one set of motion information is present for each PU. In addition, each PU is coded with a unique inter-prediction mode to derive the set of motion information.

For motion prediction in HEVC for example, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, one or more scaling window offsets can be included along with stored motion vectors in a MV candidate list.

In examples where a MV candidate list is used for motion prediction of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g., information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2A:
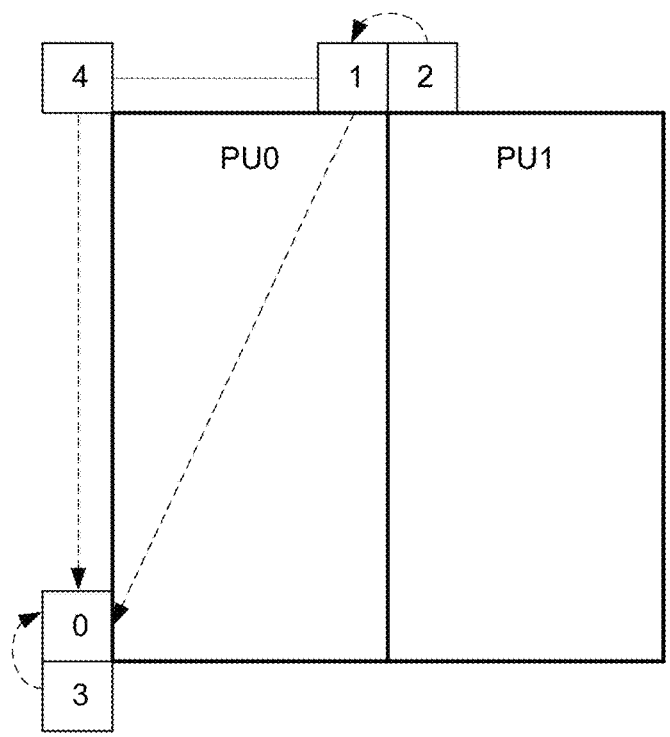
FIG. 2A is a conceptual diagram illustrating example spatial neighboring motion vector candidates for a merge mode, in accordance with some examples of the disclosure.
Figure 2B:
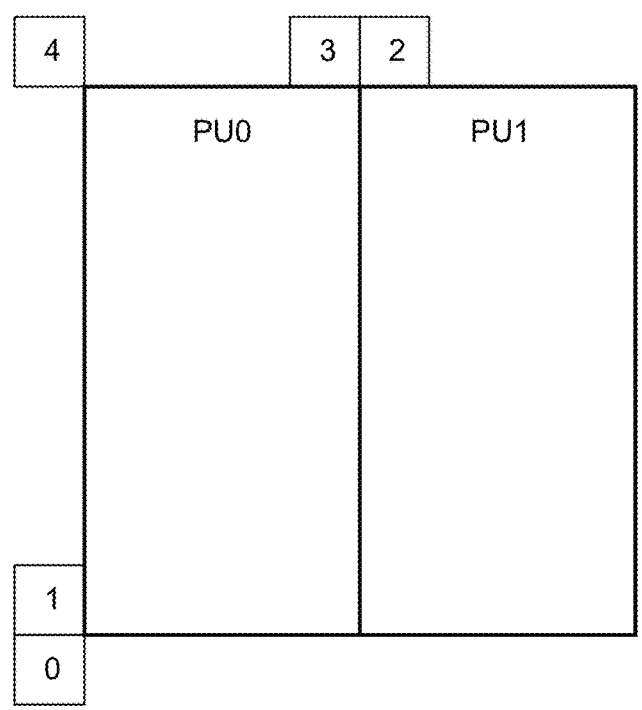
FIG. 2B is a conceptual diagram illustrating example spatial neighboring motion vector candidates for an advanced motion vector prediction (AMVP) mode, in accordance with some examples of the disclosure.

The candidates for both modes can be derived from spatial and/or temporal neighboring blocks. For example, FIG. 2A and FIG. 2B include conceptual diagrams illustrating spatial neighboring candidates. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PUO), although the methods generating the candidates from the blocks differ for merge and AMVP modes.

In merge mode, the encoder and/or decoder can form a merging candidate list by considering merging candidates from various motion data positions. For example, as shown in FIG. 2A, up to four spatial MV candidates can be derived with respect to spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
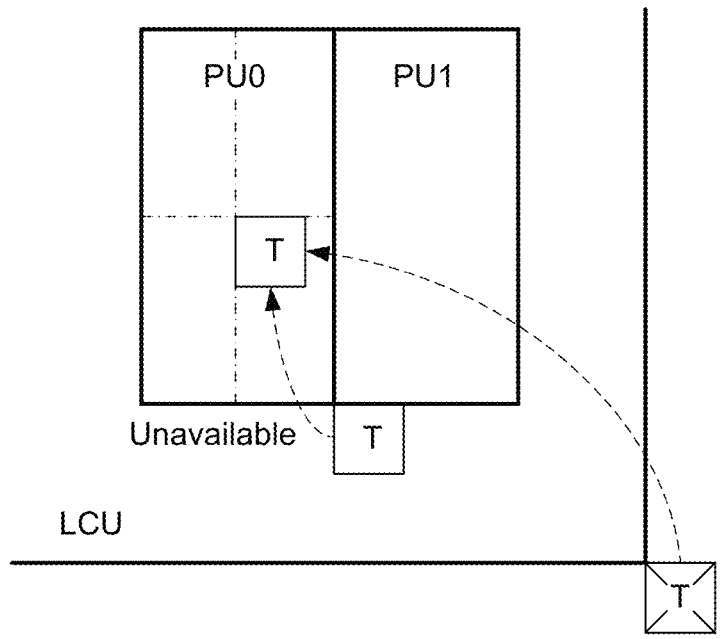
FIG. 3A is a conceptual diagram illustrating an example temporal motion vector predictor (TMVP) candidate, in accordance with some examples of the disclosure.
Figure 3B:
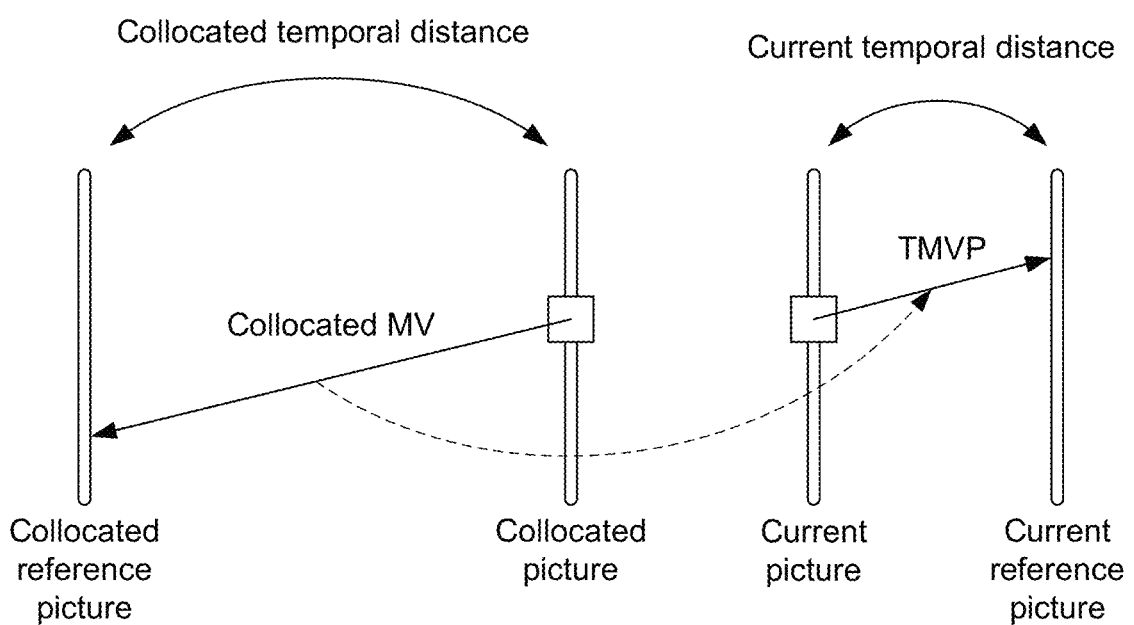
FIG. 3B is a conceptual diagram illustrating an example of motion vector scaling, in accordance with some examples of the disclosure.

FIG. 3A and FIG. 3B include conceptual diagrams illustrating temporal motion vector prediction. A temporal motion vector predictor (TMVP) candidate, if enabled and available, is added to a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard and/or other standard, format, or codec. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And, the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

In some implementations, a pruning process can be performed when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. In one illustrative example, the horizontal displacement ($\Delta x$) and the vertical displacement (Δy) (indicating a position of a reference block relative to a position of the current block) of a stored motion vector can be compared to the horizontal displacement (Δx) and the vertical displacement (Δy) of the motion vector of a potential candidate. If the comparison reveals that the motion vector of the potential candidate does not match any of the one or more stored motion vectors, the potential candidate is not considered as a candidate to be pruned and can be added to the MV candidate list. If a match is found based on this comparison, the potential MV candidate is not added to the MV candidate list, avoiding the insertion of an identical candidate. In some cases, to reduce complexity, only a limited number of comparisons are performed during the pruning process instead of comparing each potential MV candidate with all existing candidates.

In certain coding schemes such as HEVC, Weighted Prediction (WP) is supported, in which case a scaling factor (denoted by a), a shift number (denoted by s) and an offset (denoted by b) is used in the motion compensation. Suppose the pixel value in position (x, y) of the reference picture is $p(x, y)$, then $p'(x, y)=((a*p(x, y)+(1<<(s-1)))>>s)+b$ instead of $p(x, y)$ is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

Figure 4A:
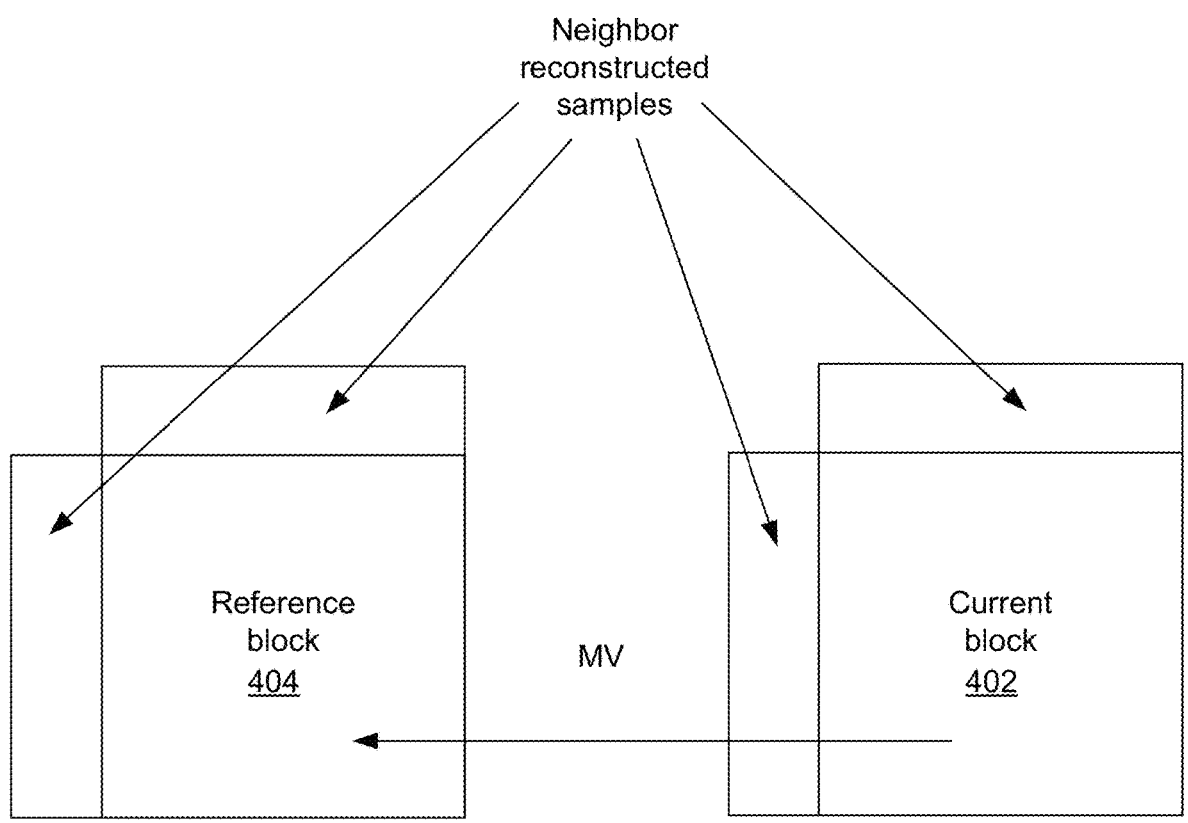
FIG. 4A is a conceptual diagram illustrating an example of neighboring samples of a current coding unit used for estimating motion compensation parameters for the current coding unit, in accordance with some examples of the disclosure.
Figure 4B:
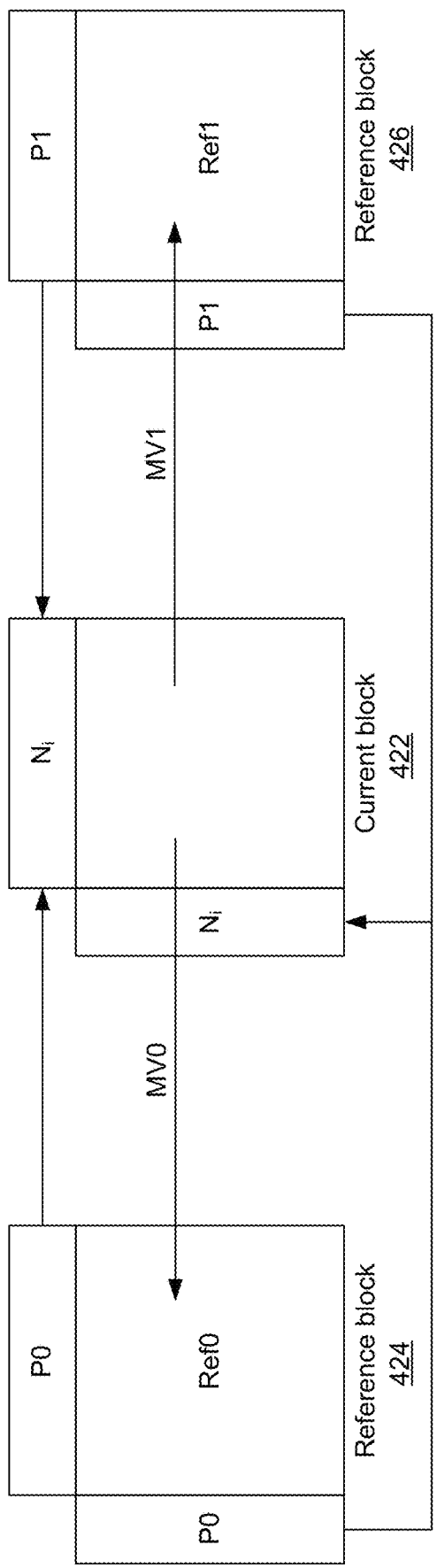
FIG. 4B is a conceptual diagram illustrating an example of neighboring samples of a reference block used for estimating motion compensation parameters for a current coding unit, in accordance with some examples of the disclosure.

FIG. 4A is a diagram illustrating an example of neighbor reconstructed samples of a current block 402 and neighbor samples of a reference block 404 used for uni-directional inter-prediction. A motion vector MV can be coded for the current block 402, where the MV can include a reference index to a reference picture list and/or other motion information for identifying the reference block 404. For example, the MV can include a horizontal and a vertical component that provides an offset from the coordinate position in the current picture to the coordinates in the reference picture identified by the reference index. FIG. 4B is a diagram illustrating an example of neighbor reconstructed samples of a current block 422 and neighbor samples of a first reference block 424 and a second reference block 426 used for bi-directional inter-prediction. In this case, two motion vectors MV0 and MV1 can be coded for the current block 422 to identify the first reference block 424 and a second reference block 426, respectively.

Bilateral matching (BM) is a technique that can be used to refine a pair of two initial motion vectors (e.g., a first motion vector MV0 and a second motion vector MV1). For example, BM can be performed by searching around the pair of initial motion vectors MV0 and MV1 to derive refined motion vectors (e.g., refined motion vectors MV0' and MV1'). The refined motion vectors MV0' and MV1' can subsequently be used to replace the first motion vector MV0 and the second motion vector MV1, respectively. The refined motion vectors can be selected in a search as the motion vectors identified in the search that minimize a block matching cost.

In some examples, the block matching cost can be generated based on the similarity between the two motion compensated predictors generated for the two MVs. Example criteria for block matching costs include, but are not limited to, sum of absolute difference (SAD), sum of absolute transformed difference (SATD), sum of square error (SSE), etc. Block matching cost criteria may also include a regularization term that is derived based on the MV differences between the current MV pair (e.g., the MV pair being considered for selection as the refined motion vectors MV0' and MV1') and the initial MV pair (e.g., MV0 and MV1).

In some examples, one or more constraints can be applied to the MV difference terms MVD0 and MVD1 (e.g., where MVD0=MV0'-MV0 and MVD1=MV1'-MV1). For example, in some cases, a constraint can be applied based on the assumption that MVD0 and MVD1 are proportional to the temporal distances (TD) between the current picture (e.g., current block) and the reference pictures (e.g., reference blocks) pointed to by the two MVs. In some examples, a constraint can be applied based on the assumption that MVD0=-MVD1 (e.g., MVD0 and MVD1 have equal magnitudes but opposite signs).

In some examples, inter-predicted CUs can be associated with one or more motion parameters. For example, in the Versatile Video Coding standard (VVC), each inter-predicted CU can be associated with one or more motion parameters that can include, but are not limited to, motion vectors, reference picture indices and reference picture list usage index. The motion parameters can further include additional information associated with coding features of VVC to be used for inter-predicted sample generation. The motion parameters can be signaled in an explicit or implicit manner. For example, when a CU is coded with skip mode, the CU is associated with one PU and has no significant residual coefficients and no coded motion vector delta or reference picture index.

In some aspects, a merge mode can be specified wherein the motion parameters for the current CU are obtained from neighboring CUs, including spatial and temporal candidates. One or more merge modes can additionally, or alternatively, be specified based on additional schedules introduced in the VVC standard. In some examples, the merge mode can be applied to any inter-predicted CU (e.g., the merge mode can be applied beyond skip mode). In some examples, an alternative to merge mode can include the explicit transmission of one or more motion parameters. For example, motion vectors, corresponding reference picture indices for each reference picture list, reference picture list usage flags, and other related information can be signaled explicitly for each CU.

Beyond the inter coding features in HEVC, VVC includes a number of new and refined inter prediction coding techniques, which include: Extended merge prediction; Merge mode with motion vector difference (MMVD); Symmetric MVD (SMVD) signaling; Affine motion compensated prediction; Sub-block based temporal motion vector prediction (SbTMVP); Adaptive motion vector resolution (AMVR); Motion field storage: 1/16th luma sample MV storage and 8×8 motion field compression; Bi-prediction with CU-level weight (BCW); Bi-directional optical flow (BDOF); Decoder side motion vector refinement (DMVR); Geometric partitioning mode (GPM); Combined inter and intra prediction (CIIP).

For extended merge prediction in VVC merge mode (e.g., referred to as a regular or default merge mode), the merge candidate list can be constructed by including the following five types of candidates in order: Spatial motion vector prediction (MVP) from spatial neighbor CUs; Temporal MVP from collocated CUs; History-based MVP from a first-in-first-out (FIFO) table; Pairwise average MVP; and Zero MVs. The size of the merge candidate list can be signaled in a sequence parameter set header. A maximum allowed size of the merge candidate list can be six (e.g., six entries or six candidates). For each CU coded in merge mode, an index of the best merge candidate(s) is encoded using truncated unary binarization (TU). In some examples, VVC can also support parallel derivation of the merge candidate lists for all CUs within a certain size or area (e.g., as done in HEVC). The five aforementioned types of merge candidates, and an associated example derivation process of each category of merge candidate, are described in turn below.

Figure 5:
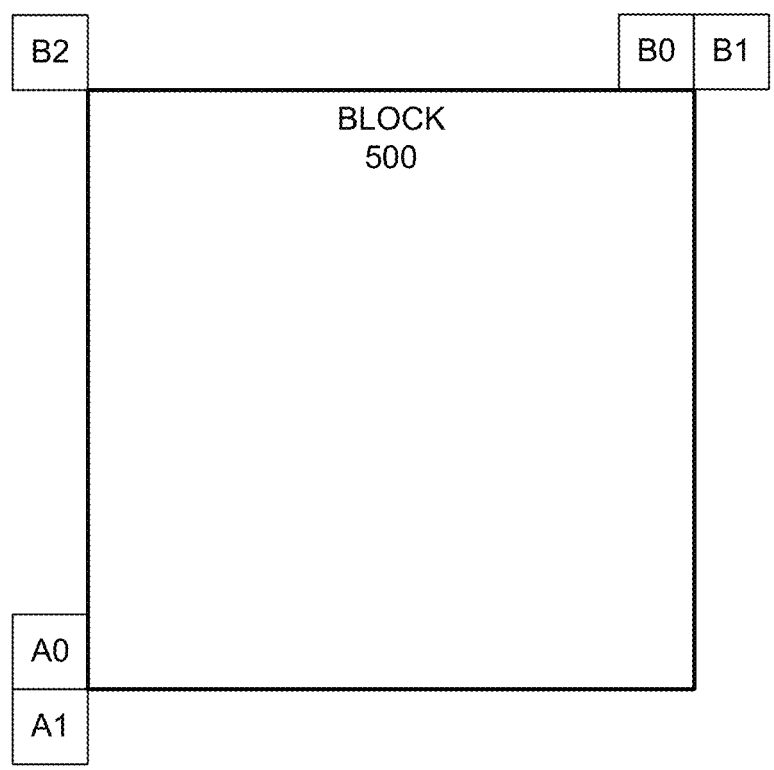
FIG. 5 illustrates locations of spatial merge candidates for use in processing a block in accordance with some examples of the disclosure.

FIG. 5 illustrates locations or positions of spatial merge candidates for use in processing a block in accordance with some examples of the disclosure. For example, FIG. 5 depicts example positions of spatial merge candidates (also referred to as "spatial neighbors") A0, A1, B0, B1, and B2 for use in processing block 500 in accordance with some examples of the disclosure. The spatial neighbors A0, A1, B0, B1, and B2 are indicated in FIG. 5 based on their relationship with block 500. The derivation of spatial merge candidates in VVC can be the same as in HEVC, with the positions of the first two merge candidates swapped. In some examples, a maximum of four merge candidates may be selected from the five spatial merge candidates located in the positions depicted in FIG. 5 (e.g., A0, A1, B0, B1, and 132).

The order of derivation can be B0, A0, B1, A1 and B2. For example, the merge candidate position B2 may be considered only when one or more CUs associated with the positions B0, A0, B11, A1 are not available or are intra coded. A CU associated with the positions B0, A0, B1, or A1 may be unavailable because the CU belongs to a different slice or tile. In some aspects, after a merge candidate at position A1 is added, the addition of the remaining merge candidates can be subject to a redundancy check. The redundancy check can be performed such that merge candidates with the same motion information are excluded from the merge candidate list (e.g., to improve coding efficiency).

Figure 6:
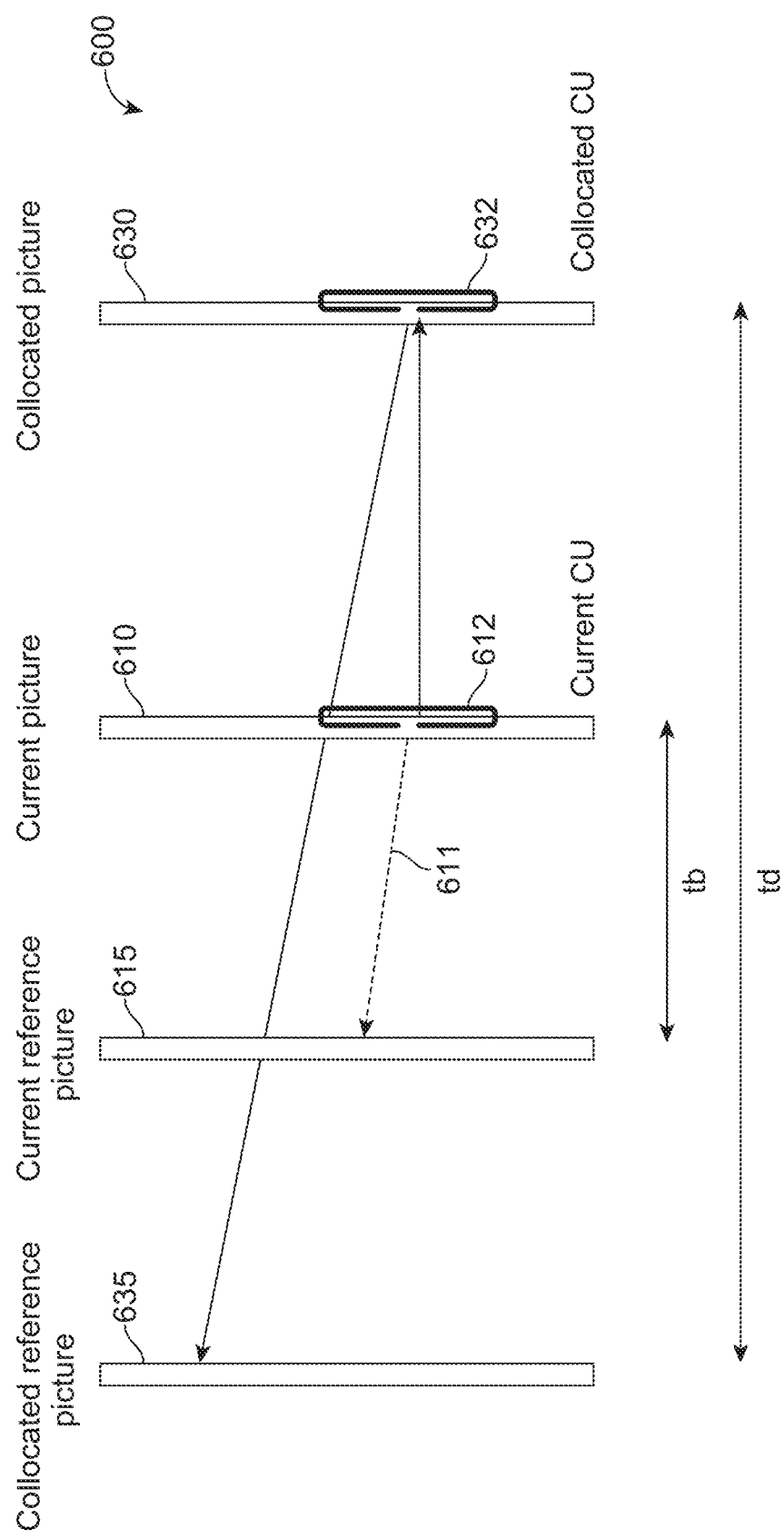
FIG. 6 illustrates aspects of motion vector scaling for temporal merge candidates for use in processing a block in accordance with some examples of the disclosure.

FIG. 6 illustrates aspects of motion vector scaling 600 for temporal merge candidates for use in processing a block in accordance with some examples of the disclosure. In some examples, temporal merge candidate derivation can be performed wherein one merge candidate (e.g., a temporal merge candidate) is added to the merge candidate list. Temporal merge candidate derivation can be performed based on a scaled motion vector. The scaled motion vector can be derived based on a collocated CU included in a collocated reference picture. The reference picture list to be used for derivation of the collocated CU can be explicitly signaled in the slice header.

For example, FIG. 6 depicts a current picture 610 and a collocated picture 630, which may be associated with a current reference picture 615 and a collocated reference picture 635, respectively. FIG. 6 also depicts a current CU 612 (e.g., associated with current picture 610) and a collocated CU (e.g., associated with collocated picture 630). In some examples, a scaled motion vector for temporal merge candidate derivation can be derived or obtained as illustrated in FIG. 6. For example, FIG. 6 depicts a dotted line 611, which is scaled from the motion vector of collocated CU 632 using the Picture Order Count (POC) distances, tb and td. In some examples, tb is the POC difference between current reference picture 615 and current picture 610 and td is the POC difference between the collocated reference picture 635 and collocated picture 630. The reference picture index of the temporal merge candidate can be set equal to zero.

Figure 7:
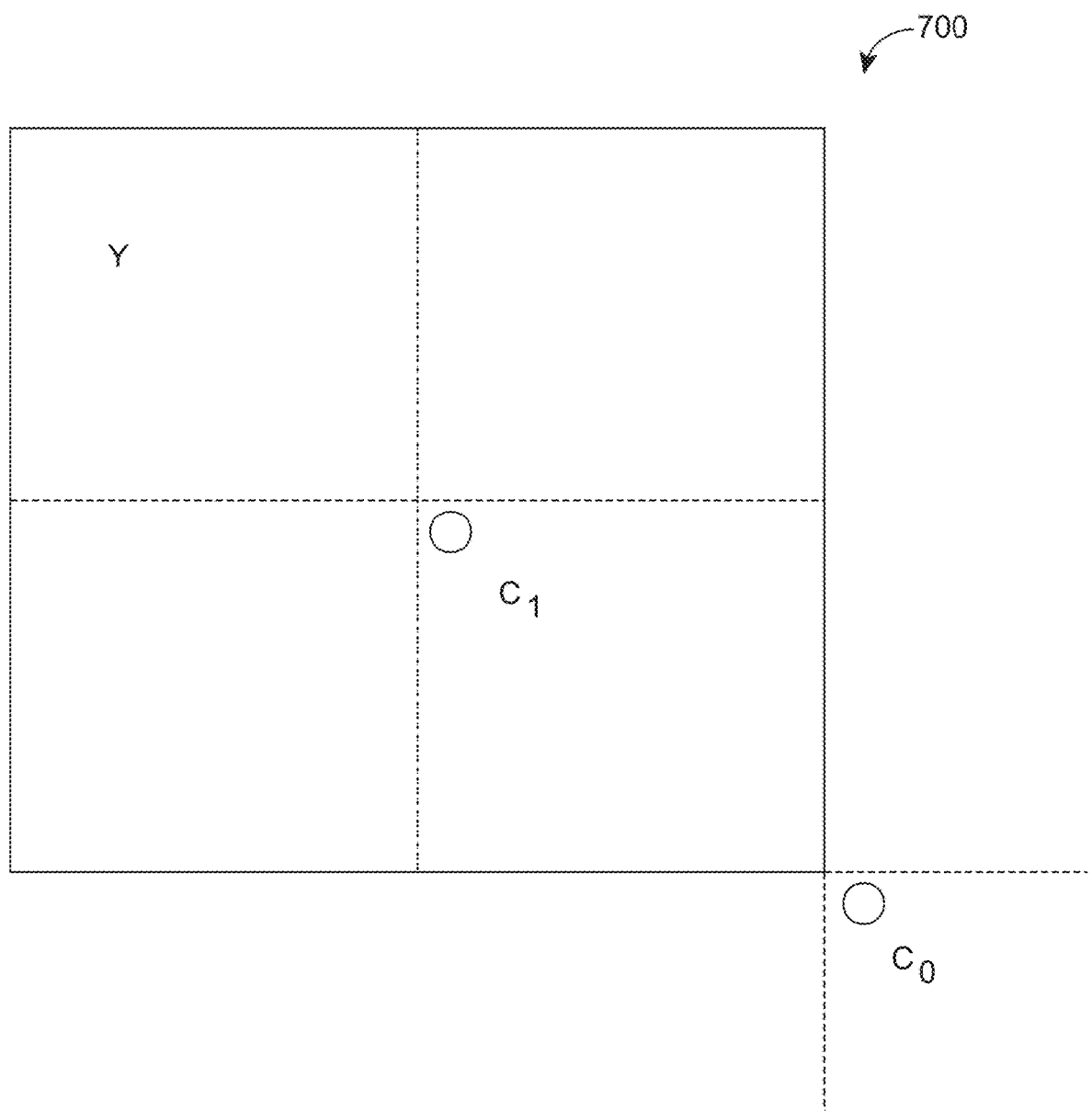
FIG. 7 illustrates aspects of temporal merge candidates for use in processing a block in accordance with some examples of the disclosure.

FIG. 7 illustrates aspects of temporal merge candidates 700 for use in processing a block in accordance with some examples of the disclosure. In some examples, after the single temporal merge candidate is selected as discussed above with respect to FIG. 6, a position for the temporal merge candidate can be selected between candidate positions $C_0$ and $C_1$, as depicted in FIG. 7. In some examples, if a CU at position $C_0$ is not available, is intra coded, or is outside of the current row of CTUs, the candidate position $C_1$ may be used. Otherwise, position $C_0$ is used in the derivation of the temporal merge candidate.

In some aspects, history-based motion vector prediction (HMVP) merge candidates may be added to the merge candidate list after the spatial MVP merge candidates (e.g., as described above with respect to FIG. 5) and the TMVP merge candidates (e.g., as described above with respect to FIGS. 6 and 7). HMVP merge candidates can be derived based on the motion information of a previously coded block. For example, motion information of a previously coded block can be stored (e.g., in a table) and used as a motion vector prediction (MVP) for the current CU. In some examples, a table with multiple HMVP candidates can be maintained during an encoding and/or decoding process. The table is reset (e.g., emptied) when a new CTU row is encountered. Whenever there is a non-sub-block inter-coded CU, the associated motion information is added to the last entry of the table as a new HMVP candidate.

In some examples, an HMVP table size S can be set to a value of six (e.g., up to six History-based MVP (HMVP) candidates may be added to the HMVP table). When inserting a new HMVP candidate into the HMVP table, a constrained first-in-first-out (FIFO) rule can be utilized. The constrained FIFO rule can include a redundancy check applied to determine whether there is an identical HMVP in the table (e.g., to determine whether the newly inserted HMVP candidate is the same as an existing HMVP candidate in the table). If the redundancy check for the newly inserted HMVP candidate finds an identical HMVP is already included in the table, the identical HMVP can be removed from the table and all the HMVP candidates afterwards are moved forward.

In some aspects, HMVP candidates (e.g., included in the HMVP list or HMVP table) can subsequently be used to construct or otherwise generate the merge candidate list. For example, to generate the merge candidate list, the latest several HMVP candidates in the table can be checked in order and inserted to the merge candidate list after the TMVP candidate. A redundancy check can be applied on the HMVP candidates added to the merge candidate list, wherein the redundancy check is used to determine whether the HMVP candidates are the same as or identical to any of the spatial or temporal merge candidates that were previously added or already included in the merge candidate list.

In some examples, the number of redundancy check operations performed in association with generating the merge candidate list and/or the HMVP table can be reduced. For example, a number of HMVP candidates used for merge list generation can be set as (N<=4) ? M: (8−N), wherein N indicates the number of existing candidates in the merge candidate list and M indicates the number of available HMVP candidates in the HMVP table. In other words, if the condition N<=4 evaluates as true (e.g., the merge candidate list contains four candidates or fewer), all M of the HMVP candidates in the HMVP table will be used for merge list generation. If the condition N<=4 evaluates as false (e.g., the merge candidate list contains more than four candidates), then 8−N of the HMVP candidates in the HMVP table will be used for merge list generation. In some examples, once the total number of available merge candidates reaches the maximally allowed number of merge candidates minus 1, the merge candidate list construction process from HMVP can be terminated.

Pairwise average merge candidate derivation can be performed based on pre-defined pairs of merge candidates in the existing merge candidate list. For example, pairwise average merge candidates can be generated by averaging pre-defined pairs of merge candidates in the existing merge candidate list, where the pre-defined pairs are given as {(0, 1), (0, 2), (1, 2), (0, 3), (1, 3), (2, 3)}, where the numbers denote the merge indices to the merge candidate list. In some cases, averaged motion vectors can be calculated separately for each reference list. If both motion vectors (e.g., of a pre-defined pair) are included in the same list, these two motion vectors can be averaged even when the two motion vectors point to different reference pictures. In some cases, if only one motion vector (e.g., of a pre-defined pair) is available, the one available motion vector can be used as the averaged motion vector. If no motion vector (e.g., of a pre-defined pair) is available, the list can be identified as invalid. In some examples, if the merge candidate list is not full after pairwise average merge candidates are added as described above, one or more zero MVPs can be inserted at the end of the merge candidate list until the maximum number of merge candidates is reached.

In some aspects, bi-prediction with CU-level weight (BCW) can be utilized. For example, a bi-prediction signal can be generated by averaging two prediction signals obtained from two different reference pictures. A bi-prediction signal can additionally, or alternatively, be generated using two different motion vectors. In some examples, a bi-prediction signal can be generated by averaging two prediction signals obtained from two different reference signals and/or using two different motion vectors, using the HEVC standard.

In other aspects, the bi-prediction mode can be extended beyond simple averaging to include weighted averaging of the two prediction signals. For example, the bi-prediction mode can include weighted averaging of the two prediction signals using the VVC standard. In some examples, the bi-prediction mode can include weighted averaging of the two prediction signals as follows:

$$P_{bi-pred}=((8-w)*P_0+w*P_1+4)>>3 \qquad \text{Eq. (1)}$$

The weighted averaging bi-prediction given in Eq. (1) can include five weights, $w \in \{-2,3,4,5,10\}$. For each bi-predicted CU, the weight w can be determined according to one or more of the following. In one example, for a non-merge CU, a weight index can be signaled after the motion vector difference (MVD). In another example, for a merge CU, the weight index can be inferred from neighboring blocks, based on the merge candidate index. In some cases, BCW may only be applied to CUs with 256 or more luma samples (e.g., CUs for which the product of CU width and CU height is greater than or equal to 256). In some cases, all five of the weights w may be used for low-delay pictures. For non-low-delay pictures, only three of the five weights w may be used (e.g., the three weights $w \in \{3,4,5\}$).

At the encoder, fast search algorithms can be applied to find the weight index without significantly increasing the encoder complexity, as will be described in greater depth below. In some examples, fast search algorithms can be applied to find the weight index as described at least in part in JVET-L0646. For example, when combined with adaptive motion vector resolution (AMVR), unequal weights are only conditionally checked for 1-pel and 4-pel motion vector precisions if the current picture is a low-delay picture. When combined with affine mode, affine motion estimation (ME) can be performed for unequal weights if and only if the affine mode is selected as the current best mode. When the two reference pictures in a bi-prediction mode are the same, unequal weights may be only conditionally checked. In some cases, unequal weights are not searched when certain conditions are met (e.g., depending on the picture order count (POC) distance between the current picture and its reference pictures, the coding quantization parameter (QP), and/or the temporal level, etc.)

In some examples, a BCW weight index can be coded using one context-coded bin followed by one or more bypass-coded bins. For example, the first context-coded bin can be used to indicate if equal weight is used. If unequal weight is used, additional bins can be signaled using bypass coding to indicate which unequal weight is used.

Weighted prediction (WP) is a coding tool supported by the H.264/AVC and HEVC standards to efficiently code video content with fading. Support for WP was also added into the VVC standard. WP can be used to allow one or more weighting parameters (e.g., weight and offset) to be signaled for each reference picture in each of the reference picture lists L0 and L1. Subsequently, during motion compensation, the weight(s) and offset(s) of the corresponding reference picture(s) are applied.

WP and BCW can be utilized with different types of video content. In some examples, if a CU utilizes WP, then the BCW weight index may not be signaled and w can be inferred to have a value of 4 (e.g., equal weight is applied). For example, the BCW weight index may not be signaled when a CU utilizes WP in order to avoid interactions between WP and BCW (e.g., which can complicate VVC decoder design).

For a merge CU, the weight index can be inferred from neighboring blocks based on the merge candidate index, in both normal merge mode and inherited affine merge mode. For constructed affine merge mode, the affine motion information can be constructed based on the motion information of up to three blocks. For example, the BCW index for a CU using the constructed affine merge mode can be set equal to the BCW index of the first control point MV. In some examples, using the VVC standard, combined inter and intra prediction (CIIP) and bi-prediction with CU-level weight (BCW) cannot be jointly applied for a CU. When a CU is coded with CIIP mode, the BCW index of the current CU can be set to a value of 2 (e.g., set to an equal weight).

Figure 8:
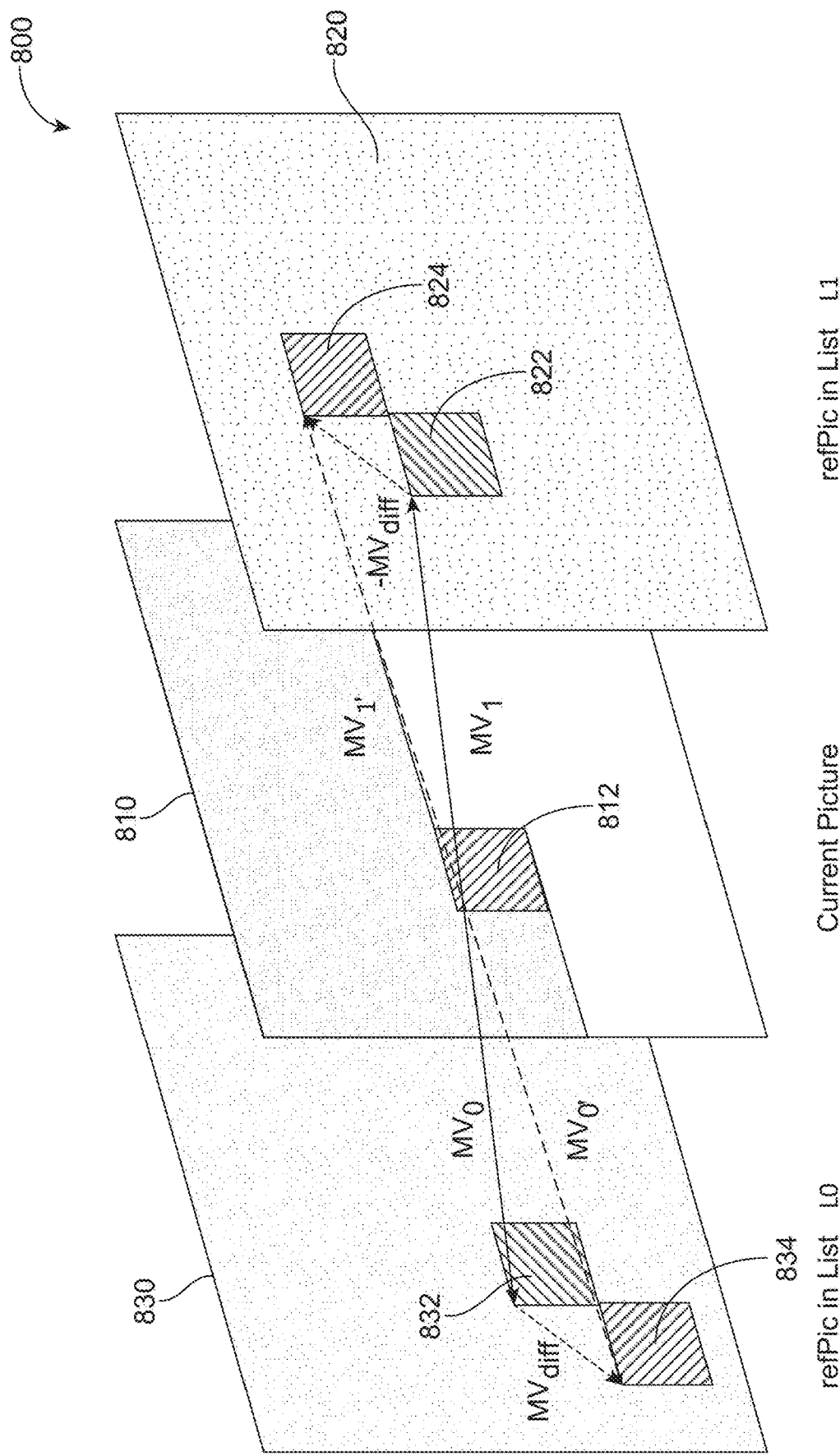
FIG. 8 illustrates aspects of bilateral matching in accordance with some examples of the disclosure.

FIG. 8 is a diagram 800 illustrating aspects of bilateral matching in accordance with some examples of the disclosure. As mentioned previously, bilateral matching (BM) can be used to refine a pair of two initial motion vectors MV0 and MV1. For example, BM can be performed by searching around the MV0 and MV1 to derive refined motion vectors MV0' and MV1', respectively, that minimize a block matching cost. The block matching cost can be calculated based on a similarity between two motion compensated predictors generated using the pair of initial motion vectors (e.g., MV0 and MV1). For example, the block matching cost can be based on a sum of absolute differences (SAD). The block matching cost can additionally, or alternatively, be based on or include a regularization term that is based on the motion vector differences (MVDs) between a current MV pair (e.g., a currently tested MV0' and MV1') and the initial MV pair (e.g., MV0 and MV1). As will be described in greater depth below, one or more constraints can be applied based on an MVD0 (e.g., MVD0=MV0'−MV0) and an MVD1 (e.g., MVD1=MV1'−MV1).

As mentioned previously, in the Versatile Video Coding standard (VVC), bilateral matching-based decoder side motion vector refinement (DMVR) can be applied to increase the accuracy of (e.g., refine) the MVs of a bi-prediction merge candidate. For example, as illustrated in the example of FIG. 8, bilateral matching-based DMVR can be applied to increase the accuracy of or otherwise refine the MVs of a bi-prediction merge candidate 812. Bi-prediction merge candidate 812 can be included in a current picture 810 and can be associated with an initial pair of motion vectors MV0 and MV1. The initial motion vectors MV0 and MV1 can be obtained, identified, or otherwise determined for bi-prediction merge candidate 812 prior to performing bilateral matching-based DMVR. Subsequently, the initial motion vectors MV0 and MV1 can be used to identify refined motion vectors MV0' and MV1' for bi-prediction merge candidate 812, as will be described in greater depth below.

As illustrated in the example of FIG. 8, the first initial motion vector MV0 can point to a first reference picture 830. First reference picture 830 can be associated with a backward direction (e.g., relative to current picture 810) and/or can be included in reference picture list L0. The second initial motion vector MV1 can point to a second reference picture 820. Second reference picture 820 can be associated with a forward direction (e.g., relative to current picture 810) and/or can be included in reference picture list L1.

The first initial motion vector MV0 can be used to determine or generate a first predictor 832, which can be a block included in first reference picture 830. First predictor 832 can also be referred to as a first candidate block (e.g., first predictor 832 is a candidate block in first reference picture 830 and/or reference picture list L0). The second initial motion vector MV1 can be used to determine or generate a second predictor 822, which can be a block included in second reference picture 820. Second predictor 822 can also be referred to as a second candidate block (e.g., second predictor 822 is a candidate block in second reference picture 820 and/or reference picture list L1).

Subsequently, a search can be performed around the first predictor 832 and the second predictor 822 to identify or determine the first refined motion vector MV0' and the second refined motion vector MV1', respectively. As illustrated, a surrounding area associated with each of the first predictor 832 (e.g., an area within first reference picture 830 and/or reference picture list L0) and the second predictor 822 (e.g., an area within second reference picture 820 and/or reference picture list L1) can be searched. For example, the surrounding area associated with first predictor 832 can be searched to identify or examine one or more refined candidate blocks 834, and the surrounding area associated with second predictor 822 can be searched to identify or examine one or more refined candidate blocks 824. The search can be performed based on one or more of a distortion (e.g., SAD, SATD, SSE, etc.) and/or a regularization term calculated between one of the initial predictors 832 or 822, and a corresponding refined candidate block 834 or 824. In some examples, the distortion and/or regularization can be calculated based on a distance moved away from an initial point (e.g., the distance between an initial point associated with the initial predictor 832 or 822, and a searched point associated with the refined candidate block 834 or 824, respectively).

As the search moves around the initial point associated with each of the initial predictors 832 and 822, a new refined candidate block (e.g., refined candidate blocks 834 and 824) is obtained. Each new refined candidate block can be associated with a new cost (e.g., a calculated SAD value, one of the motion vector differences MVD0 or MVD1, etc.). The search can be associated with a search range and/or search window. After searching each candidate block included in the search range and/or search window for initial predictors 832 and 822 (e.g., and determining the corresponding cost for each searched candidate block), a candidate block with the minimum determined cost can be identified and used to generate the refined motion vectors MV0' and MV1'.

In some examples, bilateral matching (BM) based DMVR can be performed by calculating the SAD between two candidate blocks in the reference picture list L0 and list L1. As illustrated in FIG. 8, the SAD between the blocks based on each MV' candidate (e.g., the blocks 834 and 824) around the initial MV (e.g., around predictors 832 and 822, respectively) can be calculated. The MV' candidate with the lowest SAD can be selected as the refined MV and used to generate the bi-predicted signal. In some examples, the SAD of the initial MVs is subtracted by ¼ of the SAD value to serve as regularization term. In some cases, the temporal distances (e.g., Picture Order Count (POC) difference) from two reference pictures to the current picture can be the same, and MVD0 and MVD1 can have the same magnitude but opposite sign (e.g., MVD0=−MVD1).

In some cases, bilateral matching-based DMVR can be performed using a refinement search range of two integer luma samples from the initial MV. For example, in the context of FIG. 8, bilateral matching-based DMVR can be performed using a refinement search range of two integer luma samples from the initial motion vectors MV0 and MV1 (e.g., from the initial predictors 832 and 822, respectively). The searching can include an integer sample offset search stage and a fractional sample refinement stage.

In some cases, a 25-point full search can be applied for integer sample offset searching. The 25-point full refinement search can be performed by first calculating the SAD of the initial MV pair (e.g., the initial MV pair of MV0 and MV1 and/or the initial predictors 832 and 822). If the SAD of the initial MV pair is smaller than a threshold, the integer sample stage of DMVR can be terminated. If the SAD of the initial MV pair is not smaller than the threshold, SADs of the remaining 24 points can be calculated and checked in raster scanning order. The point with the smallest SAD can then be selected as the output of the integer sample offset searching stage.

The integer sample offset search can be followed by fractional sample refinement, as mentioned above. In some cases, calculational complexity can be reduced by using one or more parametric error surface equations to derive the fractional sample refinement (e.g., rather than performing additional search(es) with SAD comparison). The fractional sample refinement can be conditionally invoked based on the output of the integer sample offset search stage. For example, when the integer sample offset search stage is terminated with the center having the smallest SAD in either the first iteration or the second iteration search, the fractional sample refinement can be further applied in response.

As mentioned above, a parametric error surface can be used to derive the fractional sample refinement. For example, in a parametric error surface based sub-pixel offsets estimation, the center position cost and the costs at four neighboring positions (e.g., relative to the center) can be used to fit a 2D parabolic error surface equation of the following form:

$$E(x,y) = A(x-x_{min})^2 + B(y-y_{min})^2 + C \quad \text{Eq. (2)}$$

Here, $(x_{min}, y_{min})$ corresponds to the fractional position with the least cost and C corresponds to the minimum cost value. By solving Eq. (2) using the cost value of the five search points (e.g., the center position and the four neighboring positions), the $(x_{min}, y_{min})$ can be computed as:

$$x_{min} = (E(-1,0)-E(1,0))/(2(E(-1,0)+E(1,0)-2E(0,0))) \quad \text{Eq. (3)}$$

$$y_{min} = (E(0,-1)-E(0,1))/(2((E(0,-1)+E(0,1)-2E(0,0))) \quad \text{Eq. (4)}$$

The values of $x_{min}$ and $y_{min}$ can be automatically constrained to be between −8 and 8 (e.g., all cost values are positive and the smallest value is E(0,0)), which can correspond to a half-pel offset with 1/16th-pel MV accuracy in VVC. The computed fractional $(x_{min}, y_{min})$ values can be added to the integer distance refinement MV (e.g., from the integer sample offset search described above) to obtain or determine a sub-pixel accurate refinement delta MV.

In VVC, motion vector resolution can be 1/16 luma samples. In some examples, samples at fractional positions are interpolated using an 8-tap interpolation filter. In DMVR, the refinement search points may surround the initial fractional-pel MV with integer sample offset and a DMVR search process can include interpolating the samples of the fractional positions. In some examples, a bi-linear interpolation filter can be used to generate the fractional samples for the DMVR search process. The use of the bi-linear interpolation filter to generate fractional samples for the DMVR search process can reduce calculation complexity. In some cases, when a bi-linear interpolation filter is utilized with a 2-sample search range, the DMVR search process may not need to access additional reference samples (e.g., relative to existing motion compensation processes).

After a refined MV is determined using the DMVR search process, an 8-tap interpolation filter can be applied to generate the final prediction. In some examples, additional reference samples may not be needed to perform interpolation process based on the original MV (e.g., as described above). In some examples, additional samples can be utilized to perform interpolation based on the refined MV. Rather than accessing additional reference samples (e.g., accessing additional reference samples relative to existing motion compensation processes), the existing or available reference samples can be padded to generate additional reference samples for performing interpolation based on the refined MV. In some cases, when the width and/or height of a CU is larger than 16 luma samples, the DMVR process can further include splitting the CU can into sub-blocks each having a width and/or height equal to 16 luma samples, as will be described in greater depth below.

In VVC, DMVR can be applied for CUs that are coded with one or more of the following modes and features. In one illustrative example, the modes or features associated with CUs for which DMVR can be applied may also be referred to as "DMVR conditions." In some examples, the DMVR conditions can include, but are not limited to, CUs that are coded with one or more of the following modes and/or features: a CU level merge mode with bi-prediction MV; one reference picture in the past (e.g., relative to the current picture) and another reference picture in the future (e.g., relative to the current picture); the distances (e.g., POC difference) from two reference pictures to the current picture are the same; both reference pictures are short-term reference pictures; a CU that includes more than 64 luma samples; both CU height and CU width are greater than or equal to 8 luma samples; a BCW weight index indicates equal weight; weighted prediction (WP) is not enabled for the current block; combined inter and intra prediction (CIIP) mode is not utilized for the current block; etc.

Figure 9:
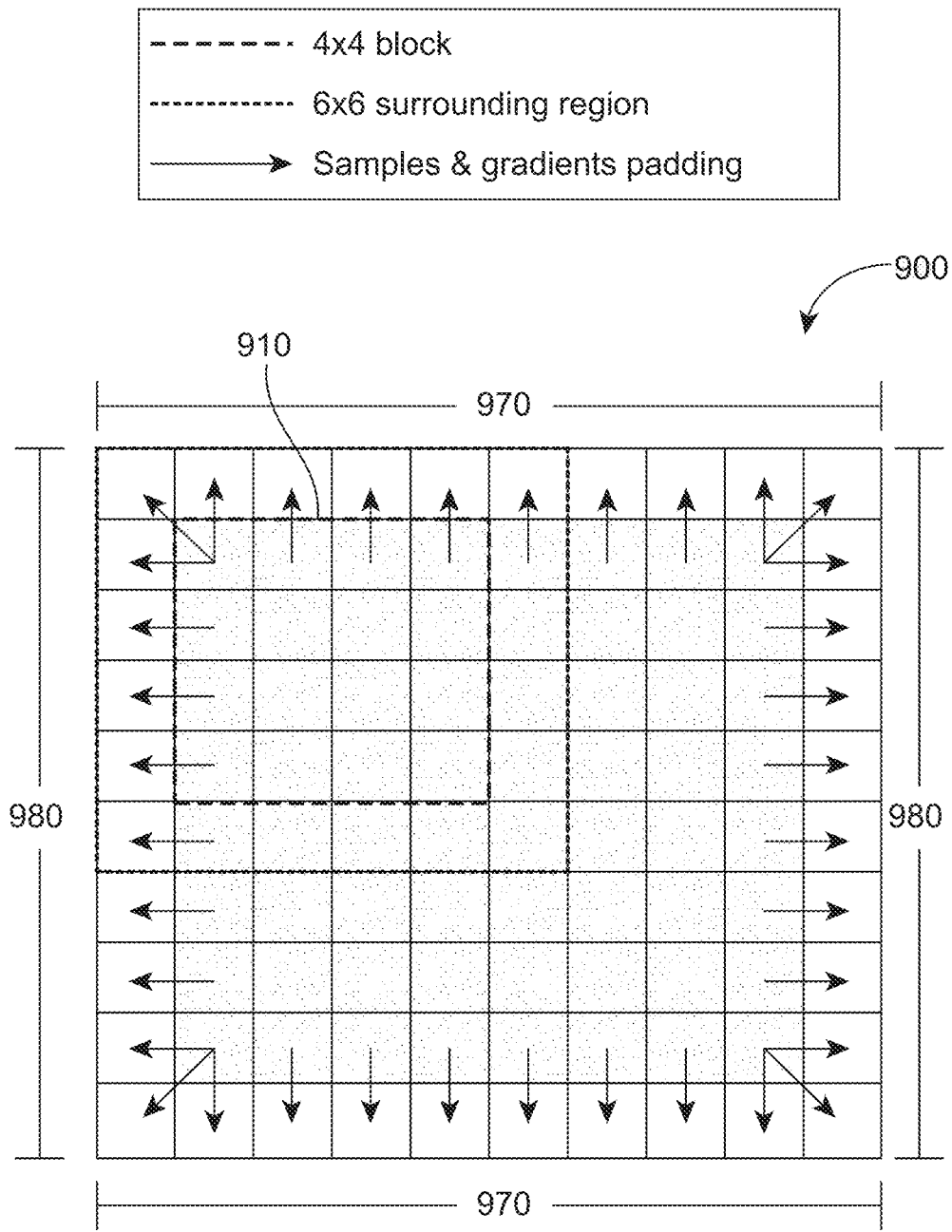
FIG. 9 illustrates aspects of bi-directional optical flow (BDOF) in accordance with some examples of the disclosure.

FIG. 9 illustrates an example extended CU region 900 that can be utilized to perform bi-directional optical flow (BDOF) in accordance with some examples of the disclosure. For example, BDOF can be used to refine the bi-prediction signal of luma samples in a CU at a 4×4 sub-block level (e.g., the 4×4 sub-block 910). In some cases, BDOF can be used for other sized sub-blocks (e.g., 8×8 sub-blocks, 4×8 sub-blocks, 8×4 sub-blocks, 16×16 sub-blocks, and/or other sized sub-blocks). The BDOF mode can be based on optical flow, which assumes that the motion of an object is smooth. As depicted in FIG. 9, the BDOF mode can utilize one extended row and column around the boundaries of the extended CU region 900 (e.g., the extended rows 970 and the extended columns 980).

For each 4×4 sub-block (e.g., 4×4 sub-block 910), a motion refinement $(v_x, v_y)$ can be calculated based on minimizing the difference between the L0 and L1 prediction samples. The motion refinement $(v_x, v_y)$ can then be used to adjust the bi-predicted sample values in the 4×4 sub-block (e.g., 4×4 sub-block 910). In one illustrative example, BDOF can be performed as described below.

First, the horizontal and vertical gradients $$\left(\frac{\partial I^{(k)}}{\partial x}(i,j) \text{ and } \frac{\partial I^{(k)}}{\partial y}(i,j),\right.$$

respectively, with k=0,1) of the two prediction signals can be computed by directly calculating the difference between two neighboring samples:

$$\frac{\partial I^{(k)}}{\partial x}(i,j) = \left(I^{(k)}(i+1,j) \gg shift1\right) - \left(I^{(k)}(i-1,j) \gg shift1\right) \quad \text{Eq. (5)}$$

$$\frac{\partial I^{(k)}}{\partial y}(i,j) = \left(I^{(k)}(i,j+1) \gg shift1\right) - \left(I^{(k)}(i,j-1) \gg shift1\right) \quad \text{Eq. (6)}$$

Here, $I^{(k)}(i,j)$ represents the sample value at coordinate (i,j) of the prediction signal in list k, k=0,1. shift1 can be calculated based on the luma bit depth (e.g., bitDepth), as shift1 can be set equal to 6.

The auto- and cross-correlation of the gradients, $S_1$, $S_2$, $S_3$, $S_5$, and $S_6$, can subsequently be calculated as:

$$S_1 = \Sigma_{(i,j) \in \Omega} |\psi_x(i,j)| \quad \text{Eq. (7)}$$

$$S_2 = \Sigma_{(i,j) \in \Omega} \psi_x(i,j) \cdot \text{sign}(\psi_y(i,j)) \quad \text{Eq. (8)}$$

$$S_3 = \Sigma_{(i,j) \in \Omega} \theta(i,j) \cdot (-\text{sign}(\psi_x(i,j))) \quad \text{Eq. (9)}$$

$$S_5 = \Sigma_{(i,j) \in \Omega} |\psi_y(i,j)| \quad \text{Eq. (10)}$$

$$S_6 = \Sigma_{(i,j) \in \Omega} \theta(i,j) \cdot (-\text{sign}(\psi_y(i,j))) \quad \text{Eq. (11)}$$

Here, $$\psi_x(i,j) = \left(\frac{\partial I^{(1)}}{\partial x}(i,j) + \frac{\partial I^{(0)}}{\partial x}(i,j)\right) \gg shift3 \quad \text{Eq. (12)}$$

-continued $$\psi_y(i, j) = \left(\frac{\partial I^{(1)}}{\partial y}(i, j) + \frac{\partial I^{(0)}}{\partial y}(i, j)\right) \gg shift3 \quad \text{Eq. (13)}$$

$$\theta(i, j) = \left(I^{(0)}(i, j) \gg shift2\right) - I^{(1)}(i, j) \gg shift2 \quad \text{Eq. (14)}$$

Here, Ω can be a 6×6 window (or other size window) around the 4×4 sub-block 910 (or other sized sub-block). The value of shift2 can be set equal to 4 (or other suitable value), and the value of shift3 can be set equal to 1 (or other suitable value).

The motion refinement ($v_x$, $v_y$) can then be derived using the cross- and auto-correlation terms using the following:

$$v_x = S_1 > 0 ? clip3(-th'_{BIO}, th'_{BIO}, -((S_3 \ll 2) \gg \lfloor \log_2 S_1 \rfloor)):0 \quad \text{Eq. (15)}$$

$$v_y = S_5 > 0 ? clip3 \quad \text{Eq. (16)}$$

$$(-th'_{BIO}, th'_{BIO}, -(((S_6 \ll 2) - ((v_x \cdot S_2) \gg 1)) \gg \lfloor \log_2 S_5 \rfloor)):0$$

Here, $th_{BIO}'=1\gg 4$ and $\lfloor \cdot \rfloor$ is the floor function.

Based on the motion refinement and the gradients, the following adjustment can be calculated for each sample in the 4×4 sub-block 910 (or other sized sub-block):

$$b(x, y) = \quad \text{Eq. (17)}$$

$$v_x \cdot \left(\frac{\partial I^{(1)}(x, y)}{\partial x} - \frac{\partial I^{(0)}(x, y)}{\partial x}\right) + v_y \cdot \left(\frac{\partial I^{(1)}(x, y)}{\partial y} - \frac{\partial I^{(0)}(x, y)}{\partial y}\right)$$

Finally, the BDOF samples of the extended CU region 900 illustrated in FIG. 9 can be calculated by adjusting the bi-prediction samples as follows:

$$\text{pred}_{BDOF}(x,y)=(I^{(0)}(x,y)+I^{(1)}(x,y)+b(x,y)+o_{offset})\gg \text{shift5} \quad \text{Eq. (18)}$$

Here, shift5 can be set equal to Max(3, 15−BitDepth) and the variable $o_{offset}$ can be set equal to (1<<(shift5−1)).

In some cases, the above values can be selected such that the multipliers in the BDOF process (e.g., described above) do not exceed 15-bits, and the maximum bit-width of the intermediate parameters in the BDOF process (e.g., described above) is kept within 32-bits.

In some examples, the gradient values can be derived based at least in part on generating one or more prediction samples $I^{(k)}(i,j)$ in list k where (k=0,1), wherein the one or more prediction samples are outside of the current CU boundaries. As depicted in FIG. 9 and noted above, BDOF can utilize one extended row and one extended column around the boundaries of the extended CU region 900 (e.g., extended row 970 and extended column 980). In some cases, the computational complexity of generating out-of-boundary prediction samples can be controlled based at least in part on generating prediction samples in the extended area (e.g., the non-shaded blocks included in extended row 970 and extended column 980, along the perimeter of extended CU region 900) by taking the reference samples at the nearby integer positions directly without interpolation. For example, a floor( ) operation can be used on the coordinates of the reference samples at the nearby reference samples. An 8-tap motion compensation interpolation filter can subsequently be used to generate prediction samples within the shaded boxes of extended CU region 900 (e.g., the boxes internal to the non-shaded perimeter of the extended area prediction samples of extended row 970 and extended column 980). In some examples, the extended sample values may be used in gradient calculation only. Remaining steps of the BDOF process can be performed by padding (e.g., repeating) any sample and gradient values outside of the boundaries of extended CU region 900 based on their nearest neighbors, as needed.

In some examples, BDOF can be used to refine the bi-prediction signal of a CU at the 4×4 sub-block level (or other sub-block levels), as mentioned above. In one illustrative example, BDOF can be applied to a CU if the CU satisfies some or all of the following conditions: the CU is coded using a "true" bi-prediction mode (e.g., one of the two reference pictures is located prior to the current picture in the display order and the other reference picture is located after the current picture in the display order); the CU is not coded using affine mode or the SbTMVP merge mode; the CU has more than 64 luma samples; both CU height and CU width are greater than or equal to 8 luma samples; BCW weight index indicates equal weight; WP is not enabled for the current CU; and/or CIIP mode is not used for the current CU; etc.

In some aspects, multi-pass decoder side motion refinement can be used. For example, in the JVET-V meeting, an enhanced compression model (ECM) was established to study compression techniques beyond VVC (https://vcgit.hhi.fraunhofer.de/ecm/VVCSoftware_VTM/-/tree/ECM). In ECM, a "multi-pass decoder side motion refinement" [JVET U0100] is adopted to replace the DMVR in VVC. The multi-pass decoder side motion refinement can include multiple passes. In some examples, multi-pass decoder side motion refinement can be performed by applying bilateral matching (BM) multiple times. For example, at each pass (e.g., of the multi-pass decoder side motion refinement), BM can be applied to a different block size.

In a first pass, bilateral matching (BM) can be applied to the entire coding block or coding unit (e.g., similar to that of DMVR in VVC and/or as described above). For example, the first pass BM can be applied to a coding block or CU with a size of 64×64, 64×32, 32×32, 32×16, 16×16, etc., and combinations thereof.

In a second pass, BM can again be applied, this time for each 16×16 sub-block that is included within (or can be generated from) the overall coding block for which BM was performed in the first pass. For example, if the first pass BM was applied to a 64×64 block, the 64×64 block can be divided into a 4×4 grid of sub-blocks where each sub-block is 16×16. In the second pass, BM can be applied to each of the 16 sub-blocks in the example above. In another example, if the first pass BM was applied to a 32×32 block, the 32×32 block can be divided into a 2×2 grid of sub-blocks that are each 16×16 in size. In this example, the second pass can be performed by applying BM to each of the four 16×16 sub-blocks of the 32×32 block. The refined MVs generated or obtained from the first pass BM can be utilized as the initial MVs for each 16×16 sub-block for which the second pass BM is performed.

In a third pass, a plurality of 8×8 sub-blocks can be obtained or generated, based on either the original block (e.g., from the first BM pass) and/or based on the 16×16 sub-blocks (e.g., from the second BM pass). In some examples, each 16×16 sub-block from the second BM pass can be divided into a 2×2 grid of sub-blocks with an 8×8 size. In the third BM pass, one or more MVs associated with each 8×8 sub-block can be further refined by applying bi-directional optical flow (BDOF).

In one illustrative example, multi-pass decoder side motion refinement can be performed for a 64×64 block or CU. In a first pass, BM can be applied for the 64×64 block to generate or obtain a pair of refined MVs. In a second pass, the 64×64 block can be divided into 16 sub-blocks, where each sub-block is 16×16 in size. In the second pass, BM can again be applied, this time to each of the 16 sub-blocks, and using the refined MVs from the first pass as the initial MVs. In a third pass, each 16×16 sub-block can be divided into four sub-blocks with an 8×8 size (e.g., for a total of 16*4=64 8×8 sub-blocks for the original 64×64 block). In the third pass, one or more MVs associated with each 8×8 sub-block can be refined by applying BDOF, as has been described previously.

Examples of a first pass, second pass, and third pass that can be included in or utilized to perform multi-pass decoder side motion refinement are described in turn below.

In some examples, a first pass can include performing block based bilateral matching (BM) motion vector (MV) refinement. For example, in the first pass, a refined MV is derived by applying BM to a coding block. Similar to decoder-side motion vector refinement (DMVR), in the bi-prediction operation associated with BM a refined MV is searched around two initial MVs (e.g., MV0 and MV1) in the reference picture lists L0 and L1. The refined MVs (e.g., $MV0_{pass1}$ and $MV1_{pass1}$) are derived around the pair of initial MVs (e.g., MV0 and MV1, respectively) based on the minimum bilateral matching cost between the two reference blocks in L0 and L1.

The first pass BM can include performing a local search to derive integer sample precision intDeltaMV. The local search can be performed by applying a 3×3 square search pattern (or other search pattern) to loop through the search range [−sHor, sHor] in a horizontal direction and to loop through the search range [−sVer, sVer] in a vertical direction. The values of sHor and sVer can be determined by the block dimension. In some cases, the maximum value of sHor and/or sVer can be 8 (or other suitable value).

The bilateral matching cost can be calculated as:

$$bilCost = mvDistanceCost + sadCost \qquad \text{Eq. (19)}$$

When the block size cbW*cbH is greater than 64 (or other block size threshold), a mean-removed sum of absolute difference (MRSAD) cost function can be applied to remove the DC effect of distortion between reference blocks. When the bilCost at the center point of the 3×3 search pattern (or other search pattern) has the minimum cost, the intDeltaMV local search is terminated. Otherwise, the current minimum cost search point becomes the new center point of the 3×3 search pattern (or other search pattern) and the local search is continued, searching for the minimum cost until reaching the end of the search range (e.g., [−sHor, sHor] in the horizontal direction and [−sVer, sVer] in the vertical direction).

In some cases, the existing fractional sample refinement can be further applied to derive the final deltaMV. The refined MVs after the first pass can then be derived as:

$$MV0_{pass1} = MV0 + deltaMV \qquad \text{Eq. (20)}$$

$$MV1_{pass1} = MV1 - deltaMV \qquad \text{Eq. (21)}$$

In some examples, a second pass can include performing sub-block based bilateral matching (BM) motion vector (MV) refinement. For example, in the second pass, a refined MV can be derived by applying BM to a 16×16 (or other size) grid sub-block. For each sub-block, a refined MV is searched around the two MVs (e.g., $MV0_{pass1}$ and $MV1_{pass1}$), obtained on the first pass, in the reference picture list L0 and L1.

Based on the search, two refined MVs, $MV0_{pass2}(sbIdx2)$ and $MV1_{pass2}(sbIdx2)$, can be derived based on the minimum bilateral matching cost between the two reference sub-blocks in L0 and L1. Here, sbIdx2=0, ..., N−1, is the index for sub-block (e.g., because the second pass BM can be applied to each sub-block generated from the original block used in the first pass BM). For example, as described previously, a total of 16 sub-blocks each having dimension 16×16 can be generated or obtained for an input block with size 64×64. In this example, sbIdx2 can be an index to individual ones of the 16 sub-blocks.

For each sub-block, the second pass BM can include performing a full search to derive integer sample precision intDeltaMV. The full search can have a search range [−sHor, sHor] in the horizontal direction and a search range [−sVer, sVer] in the vertical direction. The values of sHor and sVer can be determined by the block dimension and the maximum value of sHor and sVer can be 8 (or other suitable value).

Figure 10:
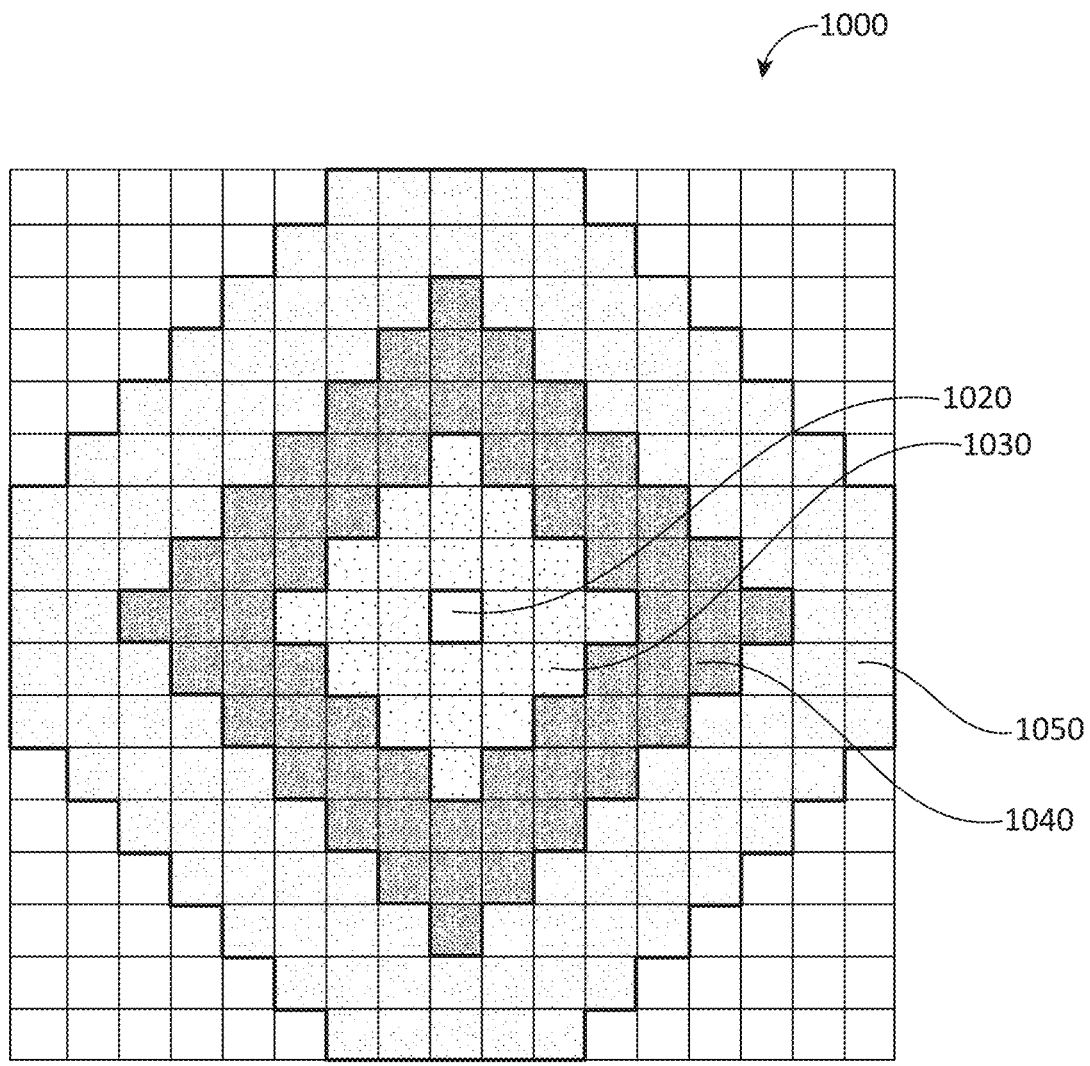
FIG. 10 illustrates search area regions in accordance with some examples of the disclosure.

FIG. 10 is a diagram illustrating example search area regions in a coding unit (CU) 1000, in accordance with some examples of the disclosure. For example, FIG. 10 depicts four different search regions in the coding unit 1000 (e.g., a first search region 1020, a second search region 1030, a third search region 1040, a fourth search region 1050, etc.). In some cases, a bilateral matching cost can be calculated by applying a cost factor to the SATD cost (or other cost function) between two reference sub-blocks, as:

$$bilCost = satdCost * costFactor \qquad \text{Eq. (22)}$$

The search area (2*sHor+1)*(2*sVer+1) is divided into five diamond-shaped search regions, as depicted in FIG. 10. In other aspects, other search regions can be used. Each search region is assigned a costFactor value, which is determined by the distance (intDeltaMV) between each search point and the starting MV. Each diamond-shaped search region (e.g., the search regions 1020, 1030, 1040, and 1050) can be processed in an order starting from the center of the search area. Within each search region, search points are processed in the raster scan order starting from the top left going to the bottom right corner of the region.

In some examples, first search region 1020 is searched first, followed by second search region 1030, followed by third search region 1040, followed by fourth search region 1050. When the minimum bilCost within the current search region is less than a threshold equal to sbW*sbH, the int-pel full search is terminated; otherwise, the int-pel full search continues to the next search region until all search points are examined.

In some cases, the VVC DMVR fractional sample refinement can be further applied to derive the final deltaMV (sbIdx2). The refined MVs at the second pass can then be derived as:

$$MV0_{pass2}(sbIdx2) = MV0_{pass1} + deltaMV(sbIdx2) \qquad \text{Eq. (23)}$$

$$MV1_{pass2}(sbIdx2) = MV1_{pass1} - deltaMV(sbIdx2) \qquad \text{Eq. (24)}$$

In some examples, a third pass can include performing sub-block based bi-directional optical flow (BDOF) motion vector (MV) refinement. For example, in the third pass, a refined MV can be derived by applying BDOF to an 8×8 (or other size) grid sub-block. For each 8×8 sub-block, BDOF refinement can be applied to derive a scaled Vx and Vy without clipping, starting from the refined MV of the parent sub-block of the second pass. For example, each parent sub-block of the second pass may be 16×16 in size (e.g., each parent sub-block of the second pass can be associated with four 8×8 sub-blocks used in the third pass). The third pass BDOF refinement can be applied or performed based on the refined MVs, $MV0_{pass2}(sbIdx2)$ and $MV1_{pass2}(sbIdx2)$, where sbIdx2 is an index of one of the parent sub-blocks of the second pass.

Subsequently, the derived bioMv(Vx, Vy) can be rounded to 1/16 sample precision and clipped between −32 and 32 (or other sample precision and/or other clipping values or ranges).

The refined MVs ($MV0_{pass3}(sbIdx3)$ and $MV1_{pass3}(sbIdx3)$) at the third pass can then be derived as:

$$MV0_{pass3}(sbIdx3)=MV0_{pass2}(sbIdx2)+bioMv \quad \text{Eq. (25)}$$

$$MV1_{pass3}(sbIdx3)=MV0_{pass2}(sbIdx2)-bioMv \quad \text{Eq. (26)}$$

Here, sbIdx3 is an index to a particular one of the 8×8 sub-blocks utilized in the third pass and sbIdx2 is an index to a particular one of the 16×16 sub-blocks utilized in the second pass. In some examples, sbIdx3 can have a range such that each 8×8 sub-block is uniquely identifiable by its sbIdx3 index. For example, a 64×64 block can be divided into 64 8×8 sub-blocks and sbIdx3 can contain 64 unique index values for the different 8×8 sub-blocks. In some examples, sbIdx3 can have a range such that each 8×8 sub-block is uniquely identifiable by its sbIdx3 value in combination with the sbIdx2 value of the corresponding 16×16 parent block. For example, a 64×64 block can be divided into a total of 16 sub-blocks each having a 16×16 size and each 16×16 sub-block can be further divided into four sub-blocks each having an 8×8 size. In this example, sbIdx2 can take one of 16 unique values and sbIdx3 can take one of four unique values, such that each of the 64 8×8 sub-blocks are identifiable based on the corresponding sbIdx2 and sbIdx3 indices.

Aspects are described herein for improving the search strategies noted above. Aspects described herein may be applied to one or more coding (e.g., encoding, decoding, or combined encoding-decoding) techniques, such as one or more coding techniques in which a block of a current picture is predicted from one or more reference pictures (e.g., two reference blocks from two respective reference pictures) using motion vectors, where the motion vectors are refined by refinement techniques. The improvements may be applied to any suitable video coding standard or format (e.g., HEVC, VVC, AV1) as described above, other existing standards or formats that apply coding for a block based on reference blocks from two respective reference pictures and to any future standards using such techniques. In general, when two reference blocks from two reference pictures are used, such techniques are generally referred to as bi-predicted merge modes and bilateral matching techniques.

Rather than following the exact search strategies described above, various aspects described herein can allowing different coded blocks to have different search strategies (or methods) for bilateral matching. The selected search strategy for a block can be signaled in one or more syntax element(s) that is(are) coded in the bitstream. The search strategy includes the constraint/relationship between MVD0 and MVD1 that is imposed during the bilateral matching search process, and may also associate with certain combination of search pattern, search range or maximum search rounds, cost criterion etc. In some cases, a constraint can also be referred to as a constrain.

The systems and techniques described herein can be utilized to perform adaptive bilateral matching (BM) for decoder side motion vector refinement (DMVR). For example, the systems and techniques can perform adaptive bilateral matching for DMVR by applying different search strategies and/or search methods for different coded blocks. In some aspects, a selected search strategy for a block can be signaled using one or more syntax elements that are coded in the bitstream. In some examples, the selected search strategy for a block can be signaled explicitly, implicitly, or using a combination thereof. As will be described in greater depth below, a selected search strategy (e.g., to be used to perform adaptive BM for DMVR for a given block) can include a constraint or relationship between MVD0 and MVD1, wherein the search strategy constraint is utilized or applied during the bilateral matching search process. In some examples, a search strategy can additionally, or alternatively, include one or more combinations of search pattern, search range, maximum search rounds, cost criterion, etc.

In one illustrative example, the systems and techniques described herein can perform adaptive bilateral matching for DMVR using one or more motion vector difference (MVD) constraints. As described previously, a motion vector difference can be used to represent the difference between an initial motion vector and a refined motion vector (e.g., MVD0=MV0'−MV0 and MVD1=MV1'−MV1).

In some examples, an MVD constraint can be selected (e.g., included in a selected search strategy) for a given bilateral matching block. For example, the MVD constraint can be a mirroring constraint, in which MVD0 and MVD1 have the same magnitude, but opposite sign (e.g., MVD0=−MVD1). The MVD mirroring constraint may also be referred to herein as a "first constraint."

In another example, the MVD constraint can set MVD0=0 (e.g., both x and y components of MVD0 are zero). For example, the MVD0=0 constraint can be utilized by holding MV0 as fixed while searching around MV1 to derived refined MV1', and MV0'=MV0. The MVD0=0 constraint may also be referred to herein as a "second constraint."

In another example, the MVD constraint can set MVD1=0 (e.g., both x and y components of MVD1 are zero). For example, the mVD1=0 constraint can be utilized by holding MV1 as fixed while searching around MV0 to derive refined MV0', and MV1'=MV1. The MVD1=0 constraint may also be referred to herein as a "third constraint."

In another example, the MVD constraint can be utilized to search independently around MV0 to derive MV0' and to search independently around MV1 to derive MV1'. The MVD independent search constraint may also be referred to herein as a "fourth constraint."

As will be described in greater depth below, in some cases, only the first and second constraints may be provided as options (e.g., included in a selected or signaled search strategy) per bilateral matching block. In some cases, only the first and third constraints are provided as options (e.g., included in a selected or signaled search strategy) per bilateral matching block. In some cases, only the first and fourth constraints are provided as options (e.g., included in a selected or signaled search strategy) per bilateral matching block. In some cases, only the second and third constraints are provided as options (e.g., included in a selected or signaled search strategy) per bilateral matching block. In some cases, the first, second, and third constraints are provided as options (e.g., included in a selected or signaled search strategy) per bilateral matching block. Any other combination of the constraints can be provided as options (e.g., included in a selected or signaled search strategy) per bilateral matching block.

In some aspects, one or more syntax elements can be signaled (e.g., in a bitstream), wherein the one or more syntax elements include value(s) to indicate whether one or more of the constraints are applied. In some examples, the syntax elements can be used to indicate or determine a specific one of the MVD constraints above to apply for a given bilateral matching block.

In one illustrative example, a first syntax element can be used to indicate whether the first constraint is applied. For example, a first syntax element can be used to indicate whether the mirroring constraint (e.g., MVD0=−MVD1) should be applied to a given bilateral matching block for which the first syntax element is signaled. In some cases, the first syntax element can have a first value when the mirroring constraint is to be applied and a second value when the mirroring constraint is not to be applied. In some cases, the presence of the first syntax element can be used to infer (e.g., implicitly signal) that the mirroring constraint is to be applied to the given or current bilateral matching block, while the absence of the first syntax element can be used to infer (e.g., implicitly signal) that the mirroring constraint should not be applied.

Continuing in the example above, if the first syntax element indicates that the first constraint (e.g., the MVD mirroring constraint, MVD0=−MVD1) is not applied, a second syntax element can be used to indicate which of the remaining constraints to apply. For example, the second syntax element can be used to indicate whether the second constraint (e.g., MVD0=0) or the third constraint (e.g., MVD1=0) should be applied to the given or current bilateral matching block for which the syntax elements are signaled. In some examples, the second syntax element can have a first value when the second constraint is to be applied and a second value when the third constraint is to be applied. In some cases, the presence of the second syntax element can be used to infer (e.g., used to implicitly signal) that a pre-determined one of the second constraint or the third constraint should be applied, while the absence of the second syntax element can be used to infer (e.g., implicitly signal) that the remaining one of the second constraint or the third constraint should be applied instead.

In some examples, the one or more syntax elements (e.g., the first syntax element and/or the second syntax element) can include mode information, and the selected constraint from the aforementioned MVD constraints can be determined based on a mode (e.g., a merge mode) indicated by the mode information. For example, the one or more syntax elements can include mode information that indicates different merge modes for the current bilateral matching block. In one illustrative example, the first constraint (e.g., the mirroring constraint, MVD0=−MVD1) can be applied to a regular (e.g., standard or default, such as extended merge prediction in VVC merge mode) merge mode coded block when a regular merge candidate satisfies the DMVR conditions noted above.

As described previously, the DMVR conditions can indicate CUs that are coded with one or more of the following modes and features. In some examples, the DMVR conditions can include, but are not limited to, CUs that are coded with one or more of the following modes and/or features: a CU level merge mode with bi-prediction MV; one reference picture in the past (e.g., relative to the current picture) and another reference picture in the future (e.g., relative to the current picture); the distances (e.g., POC difference) from two reference pictures to the current picture are the same; both reference pictures are short-term reference pictures; a CU that includes more than 64 luma samples; both CU height and CU width are greater than or equal to 8 luma samples; a BCW weight index indicates equal weight; weighted prediction (WP) is not enabled for the current block; combined inter and intra prediction (CIIP) mode is not utilized for the current block; etc.

In another illustrative example, one of the second constraint (e.g., MVD0=0) or the third constraint (e.g., MVD1=0) can be applied when the coded block uses a designated new merge mode (e.g., an adaptive bilateral matching mode, as described herein) and wherein all merge candidates meet the DMVR conditions. In some cases, the second constraint and/or the third constraint additionally or alternatively be indicated by a mode flag or merge index. For example, an indication of or selection between the second constraint and the third constraint may be determined based on a mode flag or merge index.

In some examples, the one or more syntax elements described herein can include an index of a merge candidate list. The selected constraint can then be determined by the index that indicates the selected merge candidate from a merge candidate list (e.g., the constraint depends on the selected merge candidate). In still another example, the syntax elements can include a combination of mode flags and indices.

In some aspects, the systems and techniques described herein can signal (e.g., explicitly and/or implicitly) a selected search strategy that can be utilized to perform the multi-level (e.g., multi-pass) DMVR described above. In some examples, a selected search strategy can be applied in one pass of the multi-pass DMVR. In another example, a selected search strategy can be applied in multiple levels or passes of the multi-pass DMVR (e.g., but not all levels or passes of the process in some cases).

For the example of the three-pass DMVR that is described above, in one illustrative example a selected strategy may only be applied in the first pass (e.g., the PU-level bilateral matching). The second and third passes (e.g., which perform bilateral matching for a first sub-block size and BDOF for a second sub-block size smaller than the first sub-block size, respectively) can be performed utilizing a default strategy, for example, those described above with respect to FIG. 10 and a standardized three pass structure. In one illustrative example, multi-pass DMVR (e.g., the three-pass DMVR described above) can utilize the second search strategy (e.g., the second constraint MVD0=0) and/or the third search strategy (e.g., the third constraint MVD1=0) in the first pass to perform PU-level bilateral matching. Subsequent passes (e.g., the second and third passes) can use a default search strategy that includes the first constraint (e.g., the mirroring constraint MVD0=−MVD1).

In some aspects, the search strategies can be grouped into multiple subsets. In some examples, one or more syntax elements can be used to determine the selected subsets. In some cases, a selected strategy within a given subset may be determined implicitly. In one illustrative example, the first constraint (e.g., the mirroring constraint MVD0=−MVD1) can be included in a first subset and the second constraint (e.g., MVD0=0) and the third constraint (e.g., MVD1=0) can both be included in a second subset. A syntax element can be used to indicate whether the second subset is used. If the second subset is used (e.g., based on the corresponding syntax element), then a selection or determination between applying the second constraint or the third constraint can be determined implicitly. For example, an implicit determination can be made based on the minimum matching cost between using the second constraint for bilateral matching and using the third constraint for bilateral matching. If bilateral matching using the second constraint is determined to provide a smaller matching cost than bilateral matching using the third constraint, then the second constraint can be selected, otherwise the third constraint is selected.

In some examples, one or more aspects of the systems and techniques described herein can be utilized with or applied based on the enhanced compression model (ECM). For instance, in ECM, multi-pass DMVR can be applied to a regular (e.g., a standard or default, such as extended merge prediction in VVC merge mode) merge mode candidate with one or more features that are the same as or similar to those described above. For example, the one or more features can be the same as or similar to some (or all) of the DMVR conditions described above. As noted above, a merge candidate refers to a candidate block from which information (e.g., one or more motion vectors, prediction mode, etc.) is inherited for use in coding (e.g., encoding and/or decoding) a current block, where the candidate block may be a block neighboring the current block. For instance, a merge candidate may be an inter-predicted PU that includes a motion data position selected from a group of spatially neighboring motion data positions and one of two temporally co-located motion data positions.

Multi-pass DMVR in ECM can be performed based on applying the first constraint (e.g., the mirroring constraint MVD0=−MVD1) by default. In one illustrative example, the systems and techniques described herein can utilize an adaptive bilateral matching mode as a new mode for the multi-pass DMVR. In some examples, the adaptive bilateral matching mode can also be referred to as "adaptive_bm_mode." In the adaptive_bm_mode, a merge index can be signaled to indicate the selected motion information candidate. However, all the candidates in the candidate list can satisfy the DMVR conditions. In some cases, a flag (e.g., a bm_merge_flag) can be used to signal or indicate the use of the adaptive bilateral matching mode. For example, if the flag is true (e.g., bm_merge_flag is equal to 1), adaptive_bm_mode can be used or applied (e.g., as will be described below). In some aspects, when the flag is true (e.g., bm_merge_flag is equal to 1), an additional flag (e.g., bm_dir_flag) can be used to signal or indicate a bm_dir value to be used in the adaptive_bm_mode.

In some aspects, if adaptive_bm_mode=1, adaptative bilateral matching can be performed, and if adaptive_bm_mode=0, then adaptive bilateral matching is not performed. In one illustrative example, an adaptive bilateral matching process (e.g., associated with adaptive_bm_mode=1) can be performed based at least in part on applying either the second constraint or the third constraint to the selected candidate (e.g., fixing either MVD0 or MVD1 as equal to 0, respectively). In some cases, a variable bm_dir may be used to indicate which constraint is applied and/or to indicate a selected constraint. For example, when adaptive bilateral matching is performed (e.g., signaled or determined based on adaptive_bm_mode), bm_dir=1 can be used to indicate or signal that adaptive bilateral matching should be performed by fixing MVD1 to 0 (e.g., the third constraint should be applied). In some examples, bm_dir=2 can be used to indicate or signal that adaptive bilateral matching should be performed by fixing MVD0 to 0 (e.g., the second constraint should be applied).

In some cases, if adaptive bilateral matching is not performed, a regular merge mode can be utilized. As mentioned previously, regular merge mode can be determined or signaled based on adaptive_bm_mode=0, which indicates that adaptive bilateral matching is not performed. In some examples, when regular merge mode is utilized (e.g., because adaptive bilateral matching is not performed), the systems and techniques can utilize an inferred value of bm_dir=3, which indicates or signals that MVD0 and MVD1 are not fixed and that MVD0=−MVD1 (e.g., the first, mirroring constraint should be applied). In some examples, bm_dir=3 can be explicitly signaled or used to indicate regular merge mode.

In some examples, the systems and techniques can perform bilateral matching with one or more modified bilateral matching operations. In some aspects, when bm_dir=3, the bilateral matching process can be the same as the three-pass bilateral matching process previously described above. For example, given an initial pair of MVs, a first predictor is generated by the first MV referencing to the first reference picture and a second predictor is generated by the second MV referencing to the second reference picture. A refined pair of MVs are subsequently derived by minimizing the BM cost between a refined first predictor (e.g., generated using the first refined MV) and a refined second predictor (e.g., generated using the second refined MV), wherein the motion vector differences between the refined MVs and initial MVs are MVD0 and MVD1, and MVD0=−MVD1.

In some aspects, when bm_dir=1, only the first MV is refined, while the second MV is held fixed. For example, the refined first MV can be derived by minimizing the BM cost between a second predictor that is generated by the second MV and a refined first predictor that is generated by the refined first MV. For example, when bm_dir=1, MV0 can be refined while MV1 is held fixed. A refined motion vector, MV0', can be derived by minimizing the BM cost between a predictor generated based on MV1 and a refined predictor that is generated based on MV0'.

In some examples, when bm_dir=2, only the second MV is refined, while the first MV is held fixed. For example, the refined second MV can be derived by minimizing the BM cost between a first predictor that is generated by the first MV and a refined second predictor that is generated by the refined second MV. For instance, when bm_dir=2, MV1 can be refined while MV0 is held fixed. A refined motion vector, MV1', can be derived by minimizing the BM cost between a predictor generated based on MV1 and a refined predictor that is generated based on MV1'.

In some aspects, a BM cost (e.g., as described above) can additionally, or alternatively, include a regularization term based on or derived from a motion vector difference (MVD). In one illustrative example, a multi-pass DMVR search process can include a regularization term determined based on an MV cost that depends on the refined MV position.

In some aspects, one or more of the bilateral matching modifications described above may be applied only in the first pass of a multi-pass bilateral matching process (e.g., the PU-level DMVR). In other aspects, one or more of the bilateral matching modifications described above can be applied in both a first pass and a second pass (e.g., applied in the PU-level and the sub-PU-level DMVR passes).

In some examples, the systems and techniques described herein can perform multi-pass bilateral matching DMVR using a greater or lesser quantity of passes than described in the examples above. For instance, fewer than three passes could be utilized and/or greater than three pass could be utilized. In some examples, any number of passes may be used, and the passes may be structured in any fashion. In some aspects, the multi-pass design can be similarly applied in adaptive_bm_mode. In some aspects, the second pass may be skipped in adaptive_bm_mode. In some aspects, the second pass and the third pass may both be skipped in adaptive_bm_mode. In other aspects, any combination of passes (e.g., pass operations from the three-pass system described above) can be combined with repeated passes or other pass types based on particular adaptive bilateral matching criteria.

In some aspects of multi-pass DMVR, different search patterns can be used for different search levels and/or search precision(s). For example, a square search can used for both the integer search and the half-pel search that may be applied to perform PU-level DMVR (e.g., the first pass). In some examples, for sub-PU-level DMVR (e.g., the second pass and/or third pass), full search can be used for the integer search and square search can be used for the half-pel search. In some examples, one or more (or all) of the search patterns described above can be utilized based on a determination that bm_dir is equal to a first (a value of 1), second (a value of 2), or third value (a value of 3). In one example, one or more (or all) of the search patterns described above can be utilized based on a determination that bm_dir=3.

The following aspects describe example search patterns and/or search process when bm_dir equals 1 or 2. In one aspect, the same search patterns as when bm_dir=3 can be used when bm_dir=1 and/or when bm_dir=2. In another aspect, bm_dir=1 and bm_dir=2 can use different search patterns than when bm_dir=3. For instance, in one example, full search can be used for the integer search in PU-level DMVR and square search can be used for the half-pel search in PU-level DMVR.

In some aspects, the same search range and/or maximum quantity of search rounds can be used for the different values of bm_dir. In other aspects, when bm_dir=1 or 2, a different search range and/or a different maximum quantity of search rounds can be used. For example, in the case of full search with different cost factors assigned to different MVDs, one or more MVD regions may be skipped. For example, as illustrated in FIG. 10, the search area for CU 1000 is divided into multiple search regions (e.g., first search region 1020, second search region 1030, third search region 1040, fourth search region 1050). In some cases, regions that are farther from the center of the search area (e.g., farther from first search region 1020) may be skipped.

In some examples, in regular merge mode all search regions may be searched. For example, with respect to FIG. 10, in regular merge mode the four search regions 1020, 1030, 1040, and 1050 can be searched, along with a fifth search region that includes the remaining blocks of CU 1000 that are not already included in one of the four search regions 1020-1050. As mentioned above, in some cases search regions that are farther from the center of the search area can be skipped. For example, in adaptive bilateral matching mode (e.g., when bm_dir=1 or 2), only the first three search regions associated with the CU 1000 of FIG. 10 may be searched (e.g., in adaptive bilateral matching mode, only first search region 1020, second search region 1030, and third search region 1040 may be searched).

In some aspects of multi-pass DMVR, the SAD or mean removal SAD (e.g., depending on PU size) can be used for the integer search and the half-pel search associated with a PU-level DMVR pass. In some cases, SATD can be used for the sub-PU-level DMVR. In some aspects, the same cost criterions can be used for different values of bm_dir. For example, the current cost criterions selection in ECM can be used for all values of bm_dir. In other aspects, cost criterions selection may be different for different values of bm_dir. For example, when bm_dir=3, the cost criterions selection in current ECM can be applied. The SAD or mean removal SAD, depending on the PU size, can be used for integer and half-pel search in PU-level DMVR. When bm_dir=1 or 2, the PU-level DMVR process can use SATD for the integer search and can use SAD for the half-pel search.

As mentioned previously, candidates in the candidate list for some aspects satisfy the DMVR conditions. In one additional aspect, bm_dir can be set equal to 1 or 2 as indicated by an additional bm_dir_flag included in the adaptive_bm_mode mode. In some cases, the candidate list for adaptive_bm_mode is generated on top of the regular merge candidate list. For example, one or more candidates that are determined to satisfy the DMVR conditions in the regular merge candidate list can be inserted into the candidate list for adaptive_bm_mode.

In another additional aspect, whether to set bm_dir equal to 1 or 2 can be indicated by the merge index within the adaptive_bm_mode mode. The candidate list for adaptive_bm_mode can be generated on top of regular merge candidate list. For each candidate in the regular merge candidate list that satisfies the DMVR conditions, a pair of two candidates can be inserted into the adaptive_bm_mode candidate list, one candidate with bm_dir=1 and the other candidate with bm_dir=2, wherein the two candidates in the pair have identical motion information. In some examples, the bm_dir can be determined by determining whether the merge index is an even or odd number.

In one illustrative example, the candidate list for adaptive_bm_mode can be generated independently from the regular merge candidate list. In some cases, generation of the candidate list for adaptive_bm_mode can follow the same or similar process as generating the candidate list for the regular merge mode (e.g., checking the same spatial, temporal neighboring positions, history-based candidates, pairwise candidates, etc.). In some cases, pruning may be applied during the list construction process.

In still another aspect, one or more candidates associated with a bi-prediction with CU-level weight (BCW) weight index that indicates non-equal weight may also be added into the candidate list (e.g., compared to some systems with DMVR conditions, where BCW weight index can indicate equal weight).

In some examples, a padding processing may be applied if the number of candidates in the candidate list for adaptive_bm_mode and/or in the candidate list for regular merge mode is less than a pre-defined maximum. For instance, once the candidate list for adaptive_bm_mode is generated, there may be fewer candidates in the list than a pre-defined maximum number of candidates. In such an example, the padding process can be applied to generate a number of padded candidates for the candidate list so that the padded candidate list includes the pre-defined number of candidates. In one illustrative example, in the case that adaptive bilateral matching is enabled (e.g., adaptive_bm_mode=1), one or more default candidates can be used for padding in the merge list construction. A default candidate may be derived such that it satisfies the DMVR conditions.

In some examples, the MVs may be set to zero for the default candidates. For instance, zero MV candidates can be added during the padding process. In some examples, the reference pictures can be selected according to the DMVR conditions. In some cases, the reference index can loop over all possible values until the number of candidates in the candidate list reaches the maximum number of candidates (e.g., the pre-defined maximum). In another aspect, BCW weight index can be used to indicate equal weight for the regular candidates, and one or more non-equal weight BCW candidates can be added thereafter and before adding zero candidates.

In some aspects, the reference pictures assigned to default candidates (e.g., the reference pictures assigned to the padded zero MV candidates described above) can be selected to satisfy one or more conditions associated with the adaptive_bm_mode. An illustrative example of such conditions may include one or multiple of the following conditions and/or may include other conditions not listed here: at least one pair of reference pictures is selected that includes one reference picture in the past and one reference picture in the future, relative to the current picture; the respective distances from both reference pictures to the current picture are equal; both of the reference pictures are not long-term reference pictures; both of the reference pictures have the same resolution as the current picture; weighted prediction (WP) is not applied to any of the reference pictures; any combination thereof; and/or other conditions.

In some aspects, one or more reference pictures can be assigned to the default candidates (e.g., to the padded zero MV candidates described above) based on selecting reference pictures that satisfy one or more conditions associated with or based on a specified or selected constraint (e.g., the second constraint, MVD0=0, or the third constraint, MVD1=0). In some examples, reference pictures can be selected to satisfy one or more conditions associated with a given constraint, wherein the given constraint is determined based on bm_dir (e.g., as described previously). For example, the one or more conditions based on bm_dir may be applied only to the MV for which refinement is performed (e.g., if bm_dir=1). An illustrative example of such conditions may include one or multiple of the following and/or may include other conditions not listed here: the reference picture in a given List X is not a long-term reference picture; the reference picture in List X has the same resolution as the current picture; weighted prediction (WP) is not applied to the reference picture in List X; the respective distance from a first reference picture in List X to the current picture is not smaller than the respective distance from the other reference picture (e.g., a second reference picture in list X) to the current picture; any combination thereof; and/or other conditions.

In some cases, list X can be the same as List 0 (e.g., list L0) if bm_dir indicates an MV in List 0 is refined. In some cases, list X can be the same as List 1 (e.g., list L1) if bm_dir indicates an MV in List 1 is refined. In some aspects, all possible zero MV candidates can be found by looping over all possible combinations of reference pictures and identifying the reference pictures that satisfy the pre-defined conditions in a certain order. In one illustrative example, a first loop can be performed for List 0 and a second loop can be performed for List 1. In another example, the first loop can be performed for List 1 and the second loop can be performed for List 0. Other ordering is also possible and shall be considered within the scope of the present disclosure. The process of determining the possible zero MV candidates (e.g., by looping over the combinations of reference pictures to identify reference pictures that satisfy the pre-defined conditions in a certain order) may be performed at the slice level, picture level, or other level. The list of the identified default MV candidates (e.g., the zero MV candidates) can be stored as default candidates. In some cases, when determining the possible zero MV candidates at the block level, when the number of candidates is less than the pre-defined maximum number of candidates, the systems and techniques described herein may loop over the default candidates and add one or more of the default candidates into the candidate list until the number of candidates reaches the pre-defined maximum.

In some aspects, one or more size constraints can be included in and/or utilized by the adaptive_bm_mode described herein. In one aspect, the same size constraint as in regular DMVR can be applied in adaptive_bm_mode. In another aspect, the adaptive_bm_mode is not applied if neither the width nor the height of the current block is larger than the minimum block size for DMVR.

In some aspects, the adaptive_bm_mode can be signaled as an additional merge mode to the regular merge mode. In some examples, various signaling methods may be applied or utilized to signal adaptive_bm_mode as an additional merge mode. For example, the adaptive_bm_mode can be considered or signaled as a variant of regular merge mode. In one illustrative examples, one or more syntax elements can first be signaled to indicate the regular merge mode, and one or more additional flags and/or syntax elements can be signaled to indicate the adaptive_bm_mode and/or to indicate a specific one of the constraints (e.g., the second constraint MDV0=0 or the third constraint MDV1=0) that may be applied in associated with use of the adaptive_bm_mode.

In another aspect, adaptive_bm_mode can be indicated by one or more flags prior to the indication of regular merge mode. For example, if the syntax (e.g., one or more first syntax elements) indicates the current block is not using adaptive_bm_mode, then one or more additional syntax elements may be signaled to indicate whether the current block uses regular merge mode or other merge modes. For example, if the current block does not use adaptive_bm_mode or regular merge mode, the one or more additional syntax elements may be signaled indicate that the current block uses other merge modes such as combined inter and intra prediction (CIIP), geometric partition mode (GPM), etc.

In still another aspect, adaptive_bm_mode may be signaled in other merge mode branches. For example, adaptive_bm_mode can be signaled in a template matching merge mode branch. In some cases, one or more syntax elements may first be signaled to indicate if one of the adaptive_bm_mode and the template matching merge mode is used. If the one or more syntax elements indicate that adaptive_bm_mode or template matching merge mode is used, then one or more additional flags or syntax elements can be signaled to indicate which one of template matching merge mode and adaptive_bm_mode is used.

In some aspects, the merge index in adaptive_bm_mode can use the same signaling method as in regular merge mode. In one aspect, adaptive_bm_mode can use the same (or similar) context models as in regular merge mode. In another aspect, separate context models may be used for adaptive_bm_mode. In some examples, the maximum number of merge candidates may be different for adaptive_bm_mode than the maximum number of merge candidates for regular merge mode.

In one illustrative example, one or more high-level syntax elements may be used to indicate whether adaptive_bm_mode can be applied or is to be applied. In one aspect, the same high-level syntax that is used to indicate whether regular DMVR is to be applied may also be used to indicate whether adaptive_bm_mode is to be applied. In another aspect, one or more separate (e.g., additional) high-level syntax elements can be used to indicate whether adaptive_bm_mode should be applied. In still another aspect, separate high-level syntax elements may be used to indicate whether adaptive_bm_mode is utilized, wherein the separate high-level syntax elements for adaptive_bm_mode are present only if regular DMVR is enabled. For example, if the separate high-level syntax elements associated with regular DMVR are determined to indicate that the regular DMVR is not enabled or utilized, then the separate or additional high-level syntax elements associated with adaptive_bm_mode are not signaled and adaptive_bm_mode is inferred to be off (e.g., not enabled or utilized).

In some aspects, in addition to the one or more high-level syntax elements described above, adaptive_bm_mode can be disabled for a coded picture or slice according to available reference pictures. In some cases, if it is determined that no combination of reference pictures satisfies or can satisfy the reference picture conditions, then the adaptive_bm_mode can be disabled and the corresponding syntax elements (e.g., at the block level) are not signaled. In some cases, there must be at least one pair of reference pictures that satisfy the reference picture conditions in order to utilize adaptive_bm_mode. An illustrative example of such conditions may include one or multiple of the following and/or may include other conditions not listed here: one reference picture in the past and one reference picture in the future, relative to the current picture; the respective distances from both reference pictures to the current picture are equal; both reference pictures are not long-term reference pictures; both reference pictures have the same resolution as the current picture; weighted prediction (WP) is not applied to either reference pictures; any combination thereof, and/or other conditions.

The conditions listed above can be used separately or in a combination.

In some aspects, only a subset of the adaptive bilateral matching modes described herein (e.g., a first adaptive bilateral matching mode associated with the second condition MDV0=0, and a second adaptive bilateral matching mode associated with the third condition MDV1=0) may be enabled depending on the reference pictures. An illustrative example of such conditions to only allow bm_dir=1 (e.g., associated with the second condition MDV0=0) or bm_dir=2 (e.g., associated with the third condition MDV1=0) may include one or multiple of the following and/or may include other conditions not listed here: one of the reference pictures is long-term reference picture and the other reference picture is not long-term reference picture; one of the reference pictures has the same resolution as the current picture but the other reference picture has a different resolution than the current picture; weighted prediction (WP) is applied to one of the reference pictures; the respective distance from one of the reference pictures to the current picture is not shorter than the respective distance from the other reference picture to the current picture; any combination thereof; and/or other conditions.

In some cases, a syntax element (e.g., at the block level) that identifies the bilateral matching mode may not be signaled and can inferred accordingly. In some examples, the syntax element can be implicitly signaled (e.g., inferred) rather than being explicitly signaled (e.g., in a bitstream as part of a particular syntax table). In some cases, the syntax element may be neither explicitly signaled nor implicitly signaled, and can be inferred. For example, if bm_dir of a first value is enabled (e.g., bm_dir=1 is enabled) but the bm_dir of a second value is disabled (e.g., bm_dir=2 is disabled), then a syntax element used to indicate bm_dir at the block level may not signaled. In the absence of this syntax element, bm_dir can be inferred to be a first value (e.g., bm_dir is inferred to be 1). In another example, if bm_dir of a second value is enabled (e.g., bm_dir=2) is enabled but bm_dir of a first value is disabled (e.g., bm_dir=1 is disabled), then the syntax element used to indicate bm_dir at the block level may not be signaled. In the absence of this syntax element, bm_dir can be inferred to be a second value (e.g., bm_dir is inferred to be 2).

In another example, a slice level flag and/or a picture level flag can be utilized for adaptive_bm_mode. For example, a slice level flag and/or a picture level flag can be utilized as a bitstream conformance constraint that the flag is set to 0 (e.g., DMVR modes are disabled) if at least one of the above conditions is not satisfied.

In yet another example, a bitstream conformance constraint can be introduced to the existing signaling, wherein the bitstream conformance constraint indicates that the adaptive_bm_mode should not be applied and the corresponding overhead set to 0 (e.g., indicating that the adaptive_bm_mode is not used), if at least one of the above conditions is not satisfied.

In some aspects of ECM, multiple hypothesis prediction (MHP) can be utilized. In MHP, an inter prediction technique can be used to obtain or determine a weighted superposition of more than two motion-compensated prediction signals. The resulting overall prediction signal can be obtained based on performing sample-wise weighted superposition. For example, based on a uni/bi prediction signal $p_{uni/bi}$ and a first additional inter prediction signal/hypothesis $h_3$, the resulting prediction signal $p_3$ can be obtained as follows:

$$p_3 = (1-\alpha)p_{uni/bi} + \alpha h_3 \qquad \text{Eq. (27)}$$

Here, the weighting factor $\alpha$ can be specified by a syntax element add_hyp_weight_idx, according to the following mapping:

TABLE 2

| add_hyp_weight_idx | $\alpha$ |
|---|---|
| 0 | 1/4 |
| 1 | −1/8 |

In some examples, more than one additional prediction signals can be used. In some cases, the more than one additional prediction signals can be utilized in a manner that is the same as or similar to the above. For example, when utilizing multiple additional prediction signals, a resulting overall prediction signal can be accumulated iteratively with each additional prediction signal as follows:

$$p_{n+1} = (1-\alpha_{n+1})p_n + \alpha_{n+1}h_{n+1} \qquad \text{Eq. (28)}$$

Here, the resulting overall prediction signal can be obtained as the last $p_n$ (e.g., the $p_n$ having the largest index n).

In some aspects, MHP may not be applied (e.g., is disabled) for any adaptive_bm_mode. In some aspects, MHP may be applied on top of adaptive_bm_mode in the same or similar manner as MHP is applied for a standardized (e.g., regular) merge mode.

Figure 11:
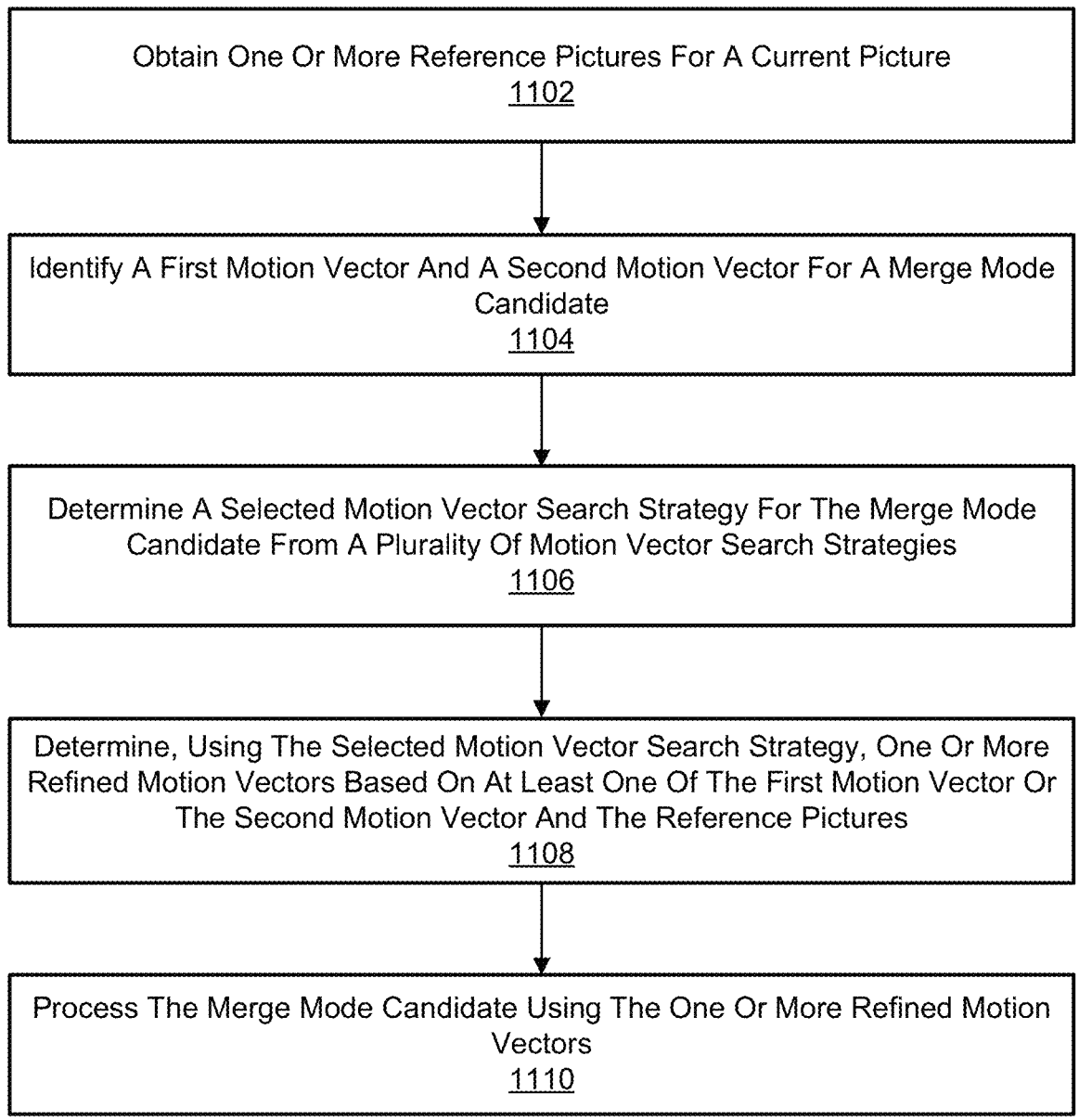
FIG. 11 is a flowchart illustrating an example process for decoder side motion vector refinement with adaptive bilateral matching, in accordance with some examples of the disclosure.

FIG. 11 is a flowchart illustrating an example of a process 1100 for processing video data. In some examples, process 100 can be used to perform decoder side motion vector refinement (DMVR) with adaptive bilateral matching, in accordance with some examples of the disclosure. In some aspects, process 1100 can be implemented in an apparatus for processing video data comprising a memory and one or more processors coupled to the memory configured to perform the operations of process 1100. In other aspects, process 1100 can be implemented in non-transitory computer readable medium comprising instructions that, when executed by one or more processors of a device, cause the device to perform the operations of process 1100.

At block 1102, the process 1100 includes obtaining one or more reference pictures for a current picture (e.g., a current block of the current picture). For example, the one or more reference pictures can be obtained based on one or more of the inputs 114 to decoding device 112 illustrated in FIG. 1. In some examples, the one or more reference pictures and the current pictures can be obtained from a video data obtained by or provided to decoding device 112 illustrated in FIG. 1.

At block 1104, the process 1100 includes identifying a first motion vector and a second motion vector for a merge mode candidate. For example, the first motion vector and/or the second motion vector can be identified by decoding device 112 illustrated in FIG. 1. In some examples, the first motion vector and/or the second motion vector can be identified using the decoder engine 116 of decoding device 112 illustrated in FIG. 1. In some cases, one or more (or both) of the first motion vector and the second motion vector can be identified using signaled information. For example, encoding device 104 illustrated in FIG. 1 can include signaling information that can be used by decoding device 112 and/or decoding engine 116 to identify one or more (or both) of the first motion vector and the second motion vector. In some cases, the process 1100 may include determining a merge mode candidate for the current picture. As noted herein, the merge mode candidate may include a neighboring block of the block from which prediction data can be inherited for a block of the current picture. For example, the merge mode candidate can be determined by decoding device 112 illustrated in FIG. 1. In some examples, the merge mode candidate can be determined using the decoder engine 116 of decoding device 112 illustrated in FIG. 1. In some examples, signaling information can be used by decoding device 112 and/or decoding engine 116 to determine the merge mode candidate for the current picture. In some cases, the merge mode candidate can be determined used the same signaling information used to identify one or more (or both) of the first motion vector and the second motion vector associated with the merge mode candidate. In some cases, the merge mode candidate and the first and second motion vectors can be determined using separate signaling information.

At block 1106, the process 1100 includes determining a selected motion vector search strategy for the merge mode candidate from a plurality of motion vector search strategies. In some aspects, the selected motion vector search strategy is associated with one or more constraints based on or corresponding to the first motion vector and/or the second motion vector. In one illustrative example, the selected motion vector search strategy can be a bilateral matching (BM) motion vector search strategy. In some cases, the motion vector search strategy for the merge mode candidate can be selected from a plurality of motion vector search strategies that include at least two of a multi-pass decoder side motion vector refinement strategy, a fractional sample refinement strategy, a bi-directional optical flow strategy, or a sub-block based bilateral matching motion vector refinement strategy. In some examples, the selected motion vector search strategy can be determined before the merge mode candidate is determined. For example, the selected motion vector search strategy may be determined (e.g., as described above) and used to generate a merge candidate list. The merge mode candidate can be determined based on a selection from the generated merge candidate list. In some examples, the selected merge mode candidate may be determined before the selected motion vector search strategy is determined. For example, in some cases the merge candidate list may be generated without using the selected search strategy (e.g., the generated merge candidate list may be the same for each respective search strategy of the plurality of search strategies), and the selected merge candidate can be determined before the selected search strategy.

In some examples, the selected motion vector search strategy can be a multi-pass decoder side motion vector refinement (DMVR) search strategy. For example, a multi-pass DMVR search strategy can include one or more block based bilateral matching motion vector refinement passes and can also include one or more sub-block based motion vector refinement passes. In some examples, the one or more block based bilateral matching motion vector refinement passes can be performed using a first constraint that is associated with a first motion vector difference and/or a second motion vector difference. The first motion vector difference can be a difference determined between the first motion vector and a refined first motion vector. The second motion vector difference can be a difference determined between the second motion vector and a refined second motion vector. In some examples, the one or more sub-block based motion vector refinement passes can be performed using a second constraint that is different than the first constraint. The second constraint can be associated with at least one of the first motion vector difference and/or the second motion vector difference, as described above. In some cases, the one or more sub-block based motion vector refinement passes can include at least one of a sub-block based bilateral matching (BM) motion vector refinement pass and/or a sub-block based bi-directional optical flow (BDOF) motion vector refinement pass.

In some examples, the selected motion vector search strategy is associated with one or more constraints corresponding to at least one of the first motion vector or the second motion vector (e.g., as described above). The one or more constraints can be determined based on one or more signaled syntax elements. For instance, the one or more constraints can be determined for the block of the current picture based on a syntax element signaled for the block. In some aspects, the one or more constraints are associated with at least one of a first motion vector difference associated with the first motion vector (e.g., the difference between the first motion vector and the refined first motion vector) and a second motion vector difference associated with the second motion vector (e.g., the difference between the second motion vector and the refined second motion vector). In some examples, the one or more constraints can include a mirroring constraint for the first motion vector difference and the second motion vector difference. The mirroring constraint can set the first motion vector difference and the second motion vector difference to have an equal magnitude (e.g., absolute value) but an opposite sign. In some cases, the one or more constraints can include a zero value constraint for the first motion vector difference (e.g., setting the first motion vector difference equal to zero). In some examples, the one or more constraints can include a zero value constraint for the second motion vector difference (e.g., setting the second motion vector difference equal to zero). In some aspects, the zero value constraint can be indicative of maintaining a motion vector difference as fixed. For instance, based on the zero value constraint, the process 1100 may include determining the one or more refined motion vectors using the selected motion vector search strategy by maintaining a first one of the first motion vector difference or the second motion vector difference as a fixed value and searching relative to a second one of the first motion vector difference or the second motion vector difference. For instance, the first motion vector difference can be fixed and a search can be performed around the second motion vector difference to derive a refined motion vector.

At block 1108, the process 1100 includes determining, using the selected motion vector search strategy, one or more refined motion vectors based on the first motion vector, the second motion vector, and/or the one or more reference pictures (e.g., based the first motion vector and the one or more reference pictures, based the second motion vector and the one or more reference pictures, or based the first motion vector, the second motion vector, and the one or more reference pictures). In some cases, determining the one or more refined motion vectors may include determining the one or more refined motion vectors for a block of the video data. In some examples, the one or more refined motion vectors can include a first refined motion vector and a second refined motion vector, determined for the first motion vector and the second motion vector, respectively. In some examples, the first motion vector difference is determined as a difference between the first refined motion vector and the first motion vector, and the second motion vector difference is determined as a difference between the second refined motion vector and the second motion vector.

In some examples, the selected motion vector search strategy is a bilateral matching (BM) motion vector search strategy, as mentioned previously. When the selected motion vector search strategy is a BM motion vector search strategy, determining the one or more refined motion vectors can include determining the first refined motion vector by searching a first reference picture around the first motion vector. The first reference picture can be searched around the first motion vector based on the selected motion vector search strategy. The second refined motion vector can be determined by searching a second reference picture around the second motion vector based on the selected motion vector search strategy. The selected motion vector search strategy can include a motion vector difference constraint (e.g., a mirroring constraint wherein the first and second motion vector difference have an equal magnitude but opposite sign, a constraint setting the first motion vector difference equal to zero, a constraint setting the second motion vector difference equal to zero, etc.) In some examples, the first refined motion vector and the second refined motion vector can be determined by minimizing a difference between a first reference block associated with the first refined motion vector and a second reference block associated with the second refined motion vector.

At block 1110, the process 1100 includes processing the merge mode candidate using the one or more refined motion vectors. For example, the decoding device 112 illustrated in FIG. 1 can process the merge mode candidate using the one or more refined motion vectors. In some examples, the decoder engine 116 of decoding device 112 illustrated in FIG. 1 can process the merge mode candidate using the one or more refined motion vectors.

In some implementations, the processes (or methods) described herein can be performed by a computing device or an apparatus, such as the system 100 shown in FIG. 1. For example, the processes can be performed by the encoding device 104 shown in FIG. 1 and FIG. 12, by another video source-side device or video transmission device, by the decoding device 112 shown in FIG. 1 and FIG. 13, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of process 1100.

In some examples, the computing device may include a wireless communication device such as a mobile device, a tablet computer, an extended reality (XR) device (e.g., a virtual reality (VR) device such as a head-mounted display (HMD), an augmented reality (AR) device such as an HMD or AR glasses, a mixed reality (MR) device such as an HMD or MR glasses, etc.), a desktop computer, a server computer and/or server system, a vehicle or computing system or component of a vehicle, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various aspects of the application have been described.

Figure 12:
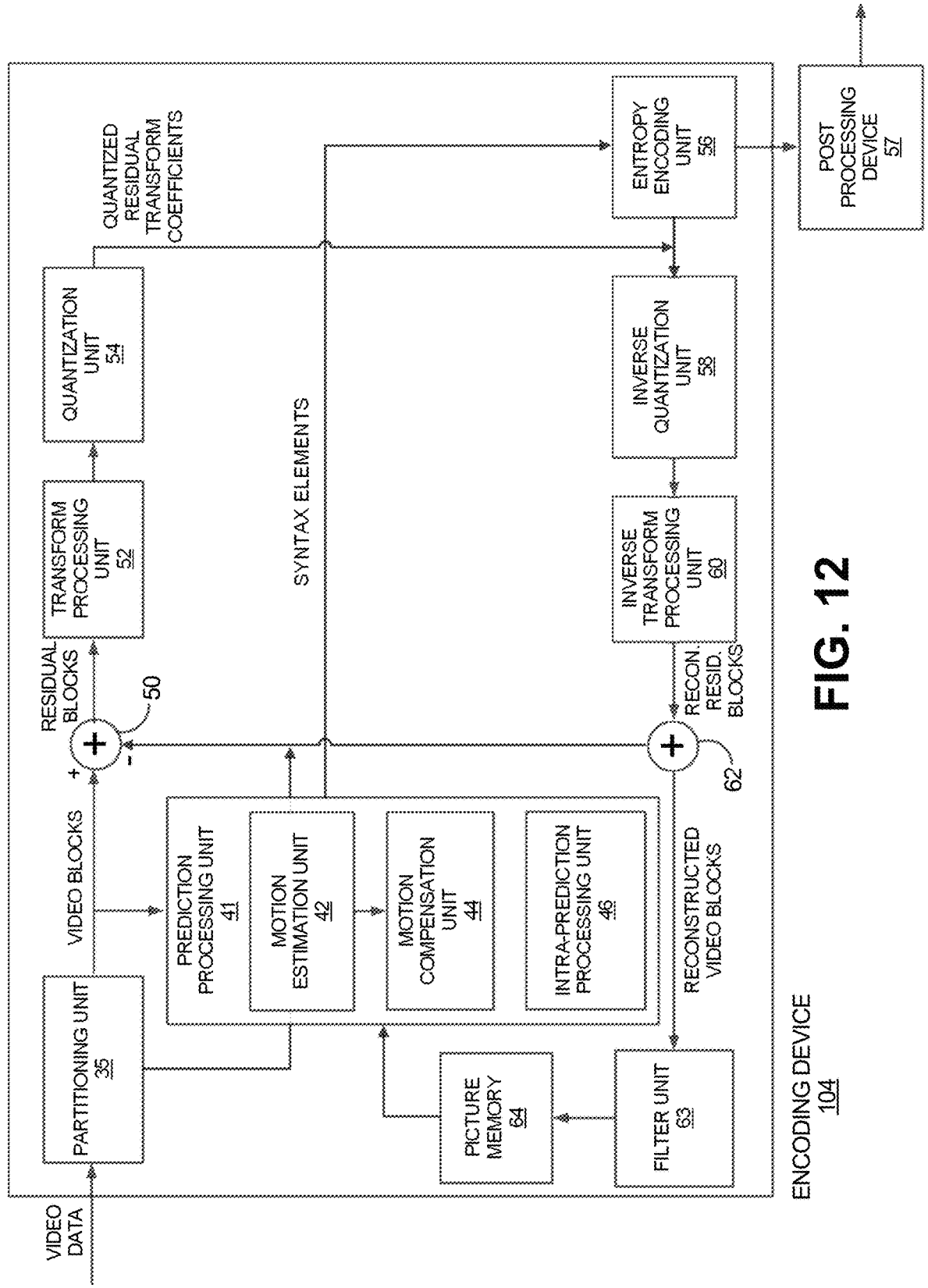
FIG. 12 is a block diagram illustrating an example video encoding device, in accordance with some examples of the disclosure.
Figure 13:
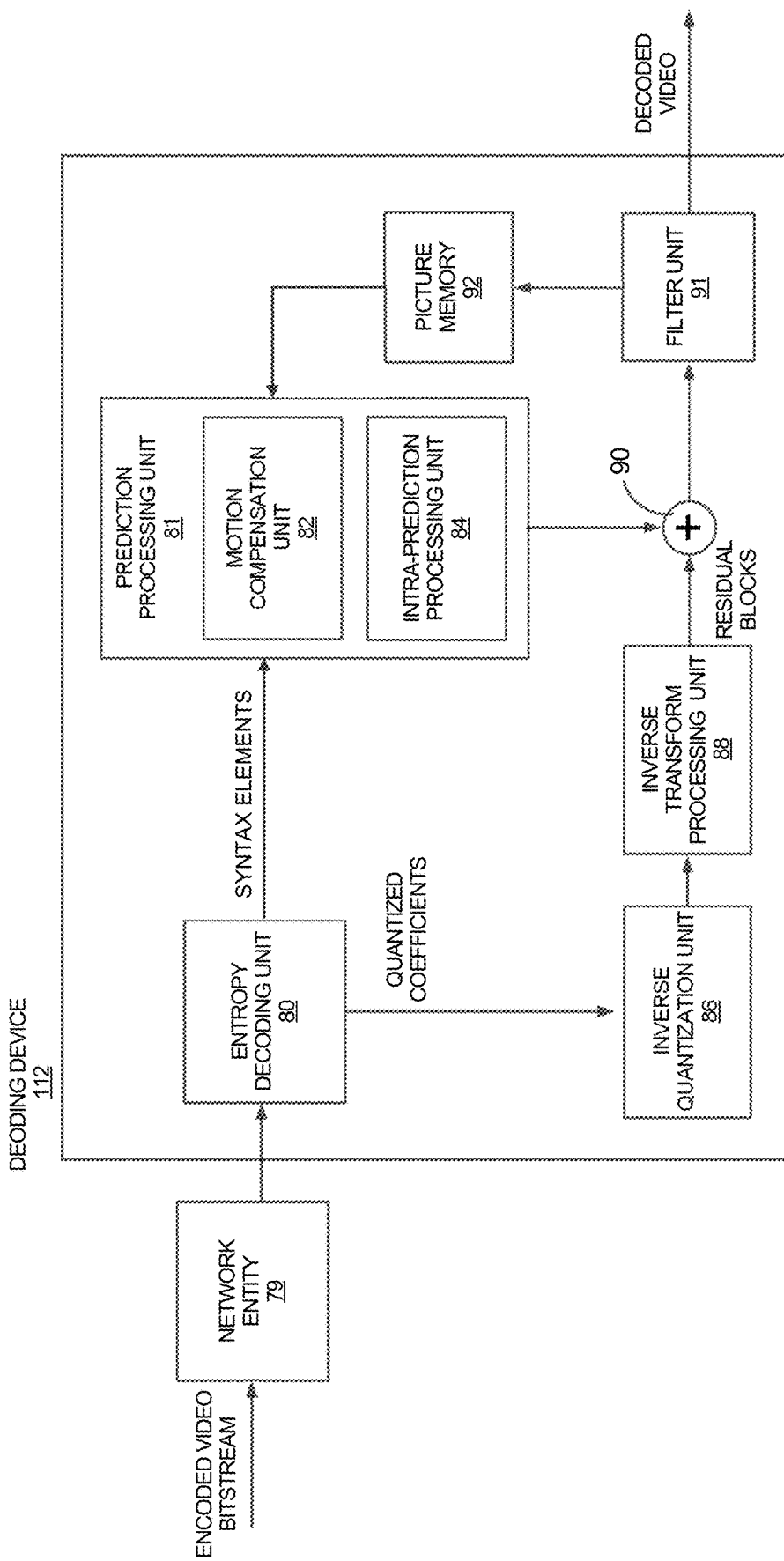
FIG. 13 is a block diagram illustrating an example video decoding device, in accordance with some examples of the disclosure.

Specific details of the encoding device 104 and the decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components.

Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 12 represents an example of a video encoder configured to perform any of the techniques described herein, including the process described above with respect to FIG. 11. In some cases, some of the techniques of this disclosure may also be implemented by post processing device 57.

FIG. 13 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some aspects, the decoding device 112 may receive the encoded video bitstream from the encoding device 104. In some aspects, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81.

The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 13 represents an example of a video decoder configured to perform any of the techniques described herein, including the process described above with respect to FIG. 11.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" and "at least one of A or B" means A, B, or A and B. In another example, claim language reciting "at least one of A, B, and C" and "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" and "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1: An apparatus for processing video data, comprising: memory; and one or more processors coupled to the memory. The one or more processors are configured to: obtain a current picture of the video data; obtain reference pictures for the current picture from the video data; determine a merge mode candidate from the current picture; identify a first motion vector and a second motion vector for the merge mode candidate; select a motion vector search strategy for the merge mode candidate from a plurality of motion vector search strategies; derive refined motion vectors from the first motion vector, the second motion vector, and the reference pictures using the motion vector search strategy; and process the merge mode candidate using the refined motion vectors.

Aspect 2: The apparatus of Aspect 1, wherein the merge mode candidate is selected from a merge candidate list.

Aspect 3: The apparatus of Aspect 2, wherein the merge candidate list is constructed from one or more of a spatial motion vector predictor from spatial neighbor blocks of the merge mode candidate, a temporal motion vector predictor from co-located blocks of the merge mode candidate, a history based motion vector predictor from a history table, a pairwise average motion vector predictor, and a zero value motion vector.

Aspect 4: The apparatus of any of Aspects 1 to 3, wherein the one or more processors being configured to generate a motion vector bi-prediction signal using the first motion vector and the second motion vector by averaging two prediction signals obtained from two different reference pictures.

Aspect 5: The apparatus of any of Aspects 1 to 4, wherein the plurality of motion vector search strategies includes a fractional sample refinement strategy.

Aspect 6: The apparatus of Aspect 5, wherein the plurality of motion vector search strategies includes a bi-directional optical flow strategy.

Aspect 7: The apparatus of Aspect 6, wherein the plurality of motion vector search strategies includes a sub-block based bilateral matching motion vector refinement strategy.

Aspect 8: The apparatus of any of Aspects 1 to 7, wherein the first motion vector and the second motion vector are associated with one or more constraints.

Aspect 9: The apparatus of Aspect 8, wherein the one or more constraints includes a mirroring constraint.

Aspect 10: The apparatus of any of Aspects 1 to 9, wherein the one or more constraints includes a zero value constraint for the first motion vector difference.

Aspect 11: The apparatus of any of Aspects 1 to 9, wherein the one or more constraints includes a zero value constraint for the second motion vector difference.

Aspect 12: The apparatus of any of Aspects 1 to 11, wherein the video data includes syntax indicating the one or more constraints.

Aspect 13: The apparatus of any of Aspects 1 to 12, wherein the motion vector search strategy comprises a multi-pass decoder side motion vector refinement strategy.

Aspect 14: The apparatus of Aspect 13, wherein the multi-pass decoder side motion vector refinement strategy includes two or more refinement passes of a same refinement type.

Aspect 15: The apparatus of Aspect 14, wherein the multi-pass decoder side motion vector refinement strategy includes one or more refinement passes of a type different than the same refinement type.

Aspect 16: The apparatus of any of Aspects 14 or 15, wherein the two or more refinement passes of the same refinement type are a block based bilateral matching motion vector refinement, a sub-block based bilateral matching motion vector refinement, or a sub-block based bi-directional optical flow motion vector refinement.

Aspect 17: The apparatus of any of Aspects 1 to 16, wherein the plurality of motion vector search strategies comprise multiple subsets of multi-pass strategies.

Aspect 18: The apparatus of Aspect 17, wherein the multiple subsets of multi-pass strategies are signaled in one or more syntax elements of the video data.

Aspect 19: The apparatus of any of Aspects 1 to 18, wherein deriving the refined motion vectors comprises calculating matching costs for a plurality of candidate motion vector pairs according to the motion vector search strategy.

Aspect 20: The apparatus of any of Aspects 1 to 19, wherein the motion vector search strategy is selected adaptively based on matching costs determined from the video data.

Aspect 21: The apparatus of any of Aspects 1 to 19, wherein the motion vector search strategy is selected to adaptively set a number of passes of the motion vector search strategy based on the video data.

Aspect 22: The apparatus of any of Aspects 1 to 19, wherein the motion vector search strategy is selected to adaptively set a search pattern for determining candidates for the refined motion vectors based on the video data.

Aspect 23: The apparatus of any of Aspects 1 to 19, wherein the motion vector search strategy is selected to adaptively set a set of criteria for generating a list of candidates for the refined motion vectors based on the video data.

Aspect 24: The apparatus of any of Aspects 1 to 19, wherein the motion vector search strategy is adaptively performed based on decoder side motion vector refinement constraints from the video data.

Aspect 25: The apparatus of any of Aspects 1 to 19, wherein the motion vector search strategy is adaptively performed based on a block size for the merge mode candidate in the video data.

Aspect 26: The apparatus of any of Aspects 1 to 25, the one or more processors being configured to disable multiple hypothesis prediction.

Aspect 27: The apparatus of any of Aspects 1 to 26, the one or more processors being configured to perform multiple hypothesis prediction in conjunction with the motion vector search strategy.

Aspect 28: The apparatus of any of Aspects 1 to 27, the one or more processors being configured to: generate a merge candidate list including the merge mode candidate.

Aspect 29: The apparatus of Aspect 28, wherein, to generate the merge candidate list, the one or more processors are configured to: determine, based on one or more conditions associated with an adaptive merge mode (e.g., conditions for the adaptive_bm_mode), one or more default candidates for adding to the merge candidate list based on a number of candidates in the merge candidate list being less than a maximum number of candidates.

Aspect 30: The apparatus of Aspect 28, wherein, to generate the merge candidate list, the one or more processors are configured to: determine, based on one or more conditions associated with a constraint associated with an adaptive merge mode (e.g., conditions according to the bm_dir), one or more default candidates for adding to the merge candidate list based on a number of candidates in the merge candidate list being less than a maximum number of candidates.

Aspect 31: The apparatus of any of Aspects 1 to 30, wherein the apparatus is a mobile device.

Aspect 32: The apparatus of any of Aspects 1 to 31, further comprising a camera configured to capture one or more frames.

Aspect 33: The apparatus of any of Aspects 1 to 32, further comprising a display configured to display one or more frames.

Aspect 34: A method of processing video data in accordance with any of the operations of Aspects 1 to 33.

Aspect 35: A computer readable storage medium comprising instructions that, when executed by one or more processors of a device, cause the device to perform the operations of any of Aspects 1 to 33.

Aspect 36: An apparatus comprising one or more means for performing any of the operations of Aspects 1 to 33.

Aspect 37: An apparatus for processing video data, comprising: at least one memory; and at least one processor coupled to the at least one memory, the at least one processor configured to: obtain one or more reference pictures for a current picture; identify a first motion vector and a second motion vector for a merge mode candidate; determine a selected motion vector search strategy for the merge mode candidate from a plurality of motion vector search strategies; determine, using the selected motion vector search strategy, one or more refined motion vectors based on at least one of the first motion vector or the second motion vector and the one or more reference pictures; and process the merge mode candidate using the one or more refined motion vectors.

Aspect 38. The apparatus of Aspect 37, wherein the selected motion vector search strategy is associated with one or more constraints based at least on at least one of the first motion vector or the second motion vector.

Aspect 39. The apparatus of Aspect 38, wherein the one or more constraints are determined for a block of the video data based on a syntax element signaled for the block.

Aspect 40. The apparatus of any of Aspects 38 or 39, wherein the one or more constraints are associated with at least one of a first motion vector difference associated with the first motion vector or a second motion vector difference associated with the second motion vector.

Aspect 41. The apparatus of Aspect 40, wherein the one or more refined motion vectors include a first refined motion vector and a second refined motion vector, and wherein the at least one processor is configured to: determine the first motion vector difference as a difference between the first refined motion vector and the first motion vector; and determine the second motion vector difference as a difference between the second refined motion vector and the second motion vector.

Aspect 42. The apparatus of any of Aspects 40 or 41, wherein the one or more constraints include a mirroring constraint for the first motion vector difference and the second motion vector difference, and wherein the first motion vector difference and the second motion vector difference have a same magnitude and a different sign.

Aspect 43. The apparatus of any of Aspects 40 to 42, wherein the one or more constraints include a zero value constraint for at least one of the first motion vector difference or the second motion vector difference.

Aspect 44. The apparatus of Aspect 43, wherein, based on the zero value constraint, the at least one processor is configured to determine the one or more refined motion vectors using the selected motion vector search strategy by maintaining a first one of the first motion vector difference or the second motion vector difference as a fixed value and searching relative to a second one of the first motion vector difference or the second motion vector difference.

Aspect 45. The apparatus of any of Aspects 37 to 44, wherein the selected motion vector search strategy is a bilateral matching (BM) motion vector search strategy.

Aspect 46. The apparatus of any of Aspects 37 to 45, wherein the at least one processor is configured to determine the one or more refined motion vectors based on one or more constraints associated with the selected motion vector search strategy, and wherein, to determine the one or more refined motion vectors based on the one or more constraints, the at least one processor is configured to: determine a first refined motion vector by searching a first reference picture around the first motion vector based on the selected motion vector search strategy; and determine a second refined motion vector by searching a second reference picture around the second motion vector based on the selected motion vector search strategy; wherein the one or more constraints include a motion vector difference constraint.

Aspect 47. The apparatus of Aspect 46, wherein, to determine the first refined motion vector and the second refined motion vector, the at least one processor is configured to: minimize a difference between a first reference block associated with the first refined motion vector and a second reference block associated with the second refined motion vector.

Aspect 48. The apparatus of any of Aspects 37 to 47, wherein the plurality of motion vector search strategies includes at least two of a multi-pass decoder side motion vector refinement strategy, a fractional sample refinement strategy, a bi-directional optical flow strategy, or a sub-block based bilateral matching motion vector refinement strategy.

Aspect 49. The apparatus of any of Aspects 37 to 48, wherein the selected motion vector search strategy comprises a multi-pass decoder side motion vector refinement strategy.

Aspect 50. The apparatus of Aspect 49, wherein the multi-pass decoder side motion vector refinement strategy includes at least one of one or more block based bilateral matching motion vector refinement passes or one or more sub-block based motion vector refinement passes.

Aspect 51. The apparatus of Aspect 50, wherein the at least one processor is configured to: perform the one or more block based bilateral matching motion vector refinement passes using a first constraint associated with at least one of a first motion vector difference or a second motion vector difference; and perform the one or more sub-block based motion vector refinement passes using a second constraint associated with at least one of the first motion vector difference or the second motion vector difference, wherein the first constraint is different than the second constraint.

Aspect 52. The apparatus of any of Aspects 50 or 51, wherein the one or more sub-block based motion vector refinement passes include at least one of a sub-block based bilateral matching motion vector refinement pass or a sub-block based bi-directional optical flow motion vector refinement pass.

Aspect 53. The apparatus of any of Aspects 37 to 52, wherein the apparatus is a wireless communication device.

Aspect 54. The apparatus of any of Aspects 37 to 53, wherein the at least one processor is configured to determine the one or more refined motion vectors for a block of the video data, and wherein the merge mode candidate includes a neighboring block of the block Aspect 55: A method for processing video data, comprising: obtaining one or more reference pictures for a current picture; identifying a first motion vector and a second motion vector for a merge mode candidate; determining a selected motion vector search strategy for the merge mode candidate from a plurality of motion vector search strategies; determining, using the selected motion vector search strategy, one or more refined motion vectors based on at least one of the first motion vector or the second motion vector and the one or more reference pictures; and processing the merge mode candidate using the one or more refined motion vectors.

Aspect 56. The method of Aspect 55, wherein the selected motion vector search strategy is associated with one or more constraints based at least on at least one of the first motion vector or the second motion vector.

Aspect 57. The method of Aspect 56, wherein the one or more constraints are determined for a block of the video data based on a syntax element signaled for the block.

Aspect 58. The method of any of Aspects 56 or 57, wherein the one or more constraints are associated with at least one of a first motion vector difference associated with the first motion vector or a second motion vector difference associated with the second motion vector.

Aspect 59. The method of Aspect 58, wherein the one or more refined motion vectors include a first refined motion vector and a second refined motion vector, the method further comprising: determining the first motion vector difference as a difference between the first refined motion vector and the first motion vector; and determining the second motion vector difference as a difference between the second refined motion vector and the second motion vector.

Aspect 60. The method of any of Aspects 58 or 59, wherein the one or more constraints include a mirroring constraint for the first motion vector difference and the second motion vector difference, and wherein the first motion vector difference and the second motion vector difference have a same magnitude and a different sign.

Aspect 61. The method of any of Aspects 58 to 60, wherein the one or more constraints include a zero value constraint for at least one of the first motion vector difference or the second motion vector difference.

Aspect 62. The method of Aspect 61, wherein, based on the zero value constraint, the one or more refined motion vectors are determined using the selected motion vector search strategy by maintaining a first one of the first motion vector difference or the second motion vector difference as a fixed value and searching relative to a second one of the first motion vector difference or the second motion vector difference.

Aspect 63. The method of any of Aspects 55 to 62, wherein the selected motion vector search strategy is a bilateral matching (BM) motion vector search strategy.

Aspect 64. The method of any of Aspects 55 to 63, wherein the one or more refined motion vectors are determined based on one or more constraints associated with the selected motion vector search strategy, and wherein determining the one or more refined motion vectors based on the one or more constraints comprises: determining a first refined motion vector by searching a first reference picture around the first motion vector based on the selected motion vector search strategy; and determining a second refined motion vector by searching a second reference picture around the second motion vector based on the selected motion vector search strategy; wherein the one or more constraints include a motion vector difference constraint.

Aspect 65. The method of Aspect 64, wherein determining the first refined motion vector and the second refined motion vector comprises: minimizing a difference between a first reference block associated with the first refined motion vector and a second reference block associated with the second refined motion vector.

Aspect 66. The method of any of Aspects 55 to 65, wherein the plurality of motion vector search strategies includes at least two of a multi-pass decoder side motion vector refinement strategy, a fractional sample refinement strategy, a bi-directional optical flow strategy, or a sub-block based bilateral matching motion vector refinement strategy.

Aspect 67. The method of any of Aspects 55 to 66, wherein the selected motion vector search strategy comprises a multi-pass decoder side motion vector refinement strategy.

Aspect 68. The method of Aspect 67, wherein the multi-pass decoder side motion vector refinement strategy includes at least one of one or more block based bilateral matching motion vector refinement passes or one or more sub-block based motion vector refinement passes.

Aspect 69. The method of Aspect 68, further comprising: performing the one or more block based bilateral matching motion vector refinement passes using a first constraint associated with at least one of a first motion vector difference or a second motion vector difference; and performing the one or more sub-block based motion vector refinement passes using a second constraint associated with at least one of the first motion vector difference or the second motion vector difference, wherein the first constraint is different than the second constraint.

Aspect 70. The method of any of Aspects 68 or 69, wherein the one or more sub-block based motion vector refinement passes include at least one of a sub-block based bilateral matching motion vector refinement pass or a sub-block based bi-directional optical flow motion vector refinement pass.

Aspect 71: A method of processing video data in accordance with any of the operations of Aspects 37 to 70.

Aspect 72: A computer readable storage medium comprising instructions that, when executed by one or more processors of a device, cause the device to perform the operations of any of Aspects 37 to 70.

Aspect 73: An apparatus comprising one or more means for performing any of the operations of Aspects 37 to 70.

What is claimed is:

1. An apparatus for processing video data, comprising:
at least one memory; and
at least one processor coupled to the at least one memory, the at least one processor configured to:
obtain one or more reference pictures for a current picture;
identify a first motion vector and a second motion vector for a merge mode candidate;
determine a selected motion vector search strategy for the merge mode candidate from a plurality of motion vector search strategies, wherein the selected motion vector search strategy is associated with one or more constraints based on at least one of the first motion vector or the second motion vector, wherein the one or more constraints are associated with at least one of a first motion vector difference associated with the first motion vector or a second motion vector difference associated with the second motion vector, and wherein the one or more constraints include a zero value constraint for at least one of the first motion vector difference or the second motion vector difference;
determine, using the selected motion vector search strategy, one or more refined motion vectors based on at least one of the first motion vector or the second motion vector and the one or more reference pictures wherein, to determine the one or more refined motion vectors and based on the zero value constraint, the at least one processor is further configured to maintain a first one of the first motion vector difference or the second motion vector difference as a fixed value and search relative to a second one of the first motion vector difference or the second motion vector difference; and
process the merge mode candidate using the one or more refined motion vectors.

2. The apparatus of claim 1, wherein the one or more constraints are determined for a block of the video data based on a syntax element signaled for the block.

3. The apparatus of claim 1, wherein the one or more refined motion vectors include a first refined motion vector or a second refined motion vector, and wherein the at least one processor is configured to:
determine the first motion vector difference as a difference between the first refined motion vector and the first motion vector; or determine the second motion vector difference as a difference between the second refined motion vector and the second motion vector.

4. The apparatus of claim 1, wherein the selected motion vector search strategy is a bilateral matching (BM) motion vector search strategy.

5. The apparatus of claim 4, wherein the at least one processor is configured to determine the one or more refined motion vectors based on one or more constraints associated with the selected motion vector search strategy, and wherein, to determine the one or more refined motion vectors based on the one or more constraints, the at least one processor is configured to:
determine a first refined motion vector by searching a first reference picture around the first motion vector based on the selected motion vector search strategy; and
determine a second refined motion vector by searching a second reference picture around the second motion vector based on the selected motion vector search strategy;
wherein the one or more constraints include a motion vector difference constraint.

6. The apparatus of claim 3, wherein, to determine the first refined motion vector and the second refined motion vector, the at least one processor is configured to:
minimize a difference between a first reference block associated with the first refined motion vector and a second reference block associated with the second refined motion vector.

7. The apparatus of claim 1, wherein the plurality of motion vector search strategies includes at least two of a multi-pass decoder side motion vector refinement strategy, a fractional sample refinement strategy, a bi-directional optical flow strategy, or a sub-block based bilateral matching motion vector refinement strategy.

8. The apparatus of claim 1, wherein the selected motion vector search strategy comprises a multi-pass decoder side motion vector refinement strategy.

9. The apparatus of claim 8, wherein the multi-pass decoder side motion vector refinement strategy includes at least one of one or more block based bilateral matching motion vector refinement passes or one or more sub-block based motion vector refinement passes.

10. The apparatus of claim 9, wherein the at least one processor is configured to:
perform the one or more block based bilateral matching motion vector refinement passes using a first constraint associated with at least one of a third motion vector difference or a fourth motion vector difference; and
perform the one or more sub-block based motion vector refinement passes using a second constraint associated with at least one of the third motion vector difference or the fourth motion vector difference, wherein the first constraint is different than the second constraint.

11. The apparatus of claim 9, wherein the one or more sub-block based motion vector refinement passes include at least one of a sub-block based bilateral matching motion vector refinement pass or a sub-block based bi-directional optical flow motion vector refinement pass.

12. The apparatus of claim 1, wherein the apparatus is a wireless communication device.

13. The apparatus of claim 1, wherein the at least one processor is configured to determine the one or more refined motion vectors for a block of the video data, and wherein the merge mode candidate includes a neighboring block of the block.

14. A method for processing video data, comprising:
obtaining one or more reference pictures for a current picture;
identifying a first motion vector and a second motion vector for a merge mode candidate;
determining a selected motion vector search strategy for the merge mode candidate from a plurality of motion vector search strategies, wherein the selected motion vector search strategy is associated with one or more constraints based on at least one of the first motion vector or the second motion vector, wherein the one or more constraints are associated with at least one of a first motion vector difference associated with the first motion vector or a second motion vector difference associated with the second motion vector, and wherein the one or more constraints include a zero value constraint for at least one of the first motion vector difference or the second motion vector difference;
determining, using the selected motion vector search strategy, one or more refined motion vectors based on at least one of the first motion vector or the second motion vector and the one or more reference pictures and by maintaining, based on the zero value constraint, a first one of the first motion vector difference or the second motion vector difference as a fixed value and searching relative to a second one of the first motion vector difference or the second motion vector difference; and
processing the merge mode candidate using the one or more refined motion vectors.

15. The method of claim 14, wherein the one or more constraints are determined for a block of the video data based on a syntax element signaled for the block.

16. The method of claim 14, wherein the one or more refined motion vectors include a first refined motion vector or a second refined motion vector, the method further comprising:
determining the first motion vector difference as a difference between the first refined motion vector and the first motion vector; or
determining the second motion vector difference as a difference between the second refined motion vector and the second motion vector.

17. The method of claim 14, wherein the selected motion vector search strategy is a bilateral matching (BM) motion vector search strategy, wherein the one or more refined motion vectors are determined based on one or more constraints associated with the selected motion vector search strategy, and wherein determining the one or more refined motion vectors based on the one or more constraints comprises:
determining a first refined motion vector by searching a first reference picture around the first motion vector based on the selected motion vector search strategy; and
determining a second refined motion vector by searching a second reference picture around the second motion vector based on the selected motion vector search strategy;
wherein the one or more constraints include a motion vector difference constraint.

18. The method of claim 17, wherein determining the first refined motion vector and the second refined motion vector comprises:
minimizing a difference between a first reference block associated with the first refined motion vector and a second reference block associated with the second refined motion vector.

19. The method of claim 14, wherein the selected motion vector search strategy comprises a multi-pass decoder side motion vector refinement strategy, the multi-pass decoder side motion vector refinement strategy including at least one of one or more block based bilateral matching motion vector refinement passes or one or more sub-block based motion vector refinement passes.

20. The method of claim 19, further comprising:
performing the one or more block based bilateral matching motion vector refinement passes using a first constraint associated with at least one of a third motion vector difference or a fourth motion vector difference; and
performing the one or more sub-block based motion vector refinement passes using a second constraint associated with at least one of the third motion vector difference or the fourth motion vector difference, wherein the first constraint is different than the second constraint.

* * * * *